United States Patent
Nagai

(10) Patent No.: US 11,615,541 B2
(45) Date of Patent: Mar. 28, 2023

(54) BALL TRACKING APPARATUS AND BALL TRACKING METHOD

(71) Applicant: GPRO Co., Ltd., Hyogo (JP)

(72) Inventor: Kyoichi Nagai, Hyogo (JP)

(73) Assignee: GPRO Co., Ltd., Hyogo (JP)

( * ) Notice: Subject to any disclaimer, the term of this patent is extended or adjusted under 35 U.S.C. 154(b) by 0 days.

(21) Appl. No.: 17/609,045

(22) PCT Filed: Oct. 30, 2020

(86) PCT No.: PCT/JP2020/040735
§ 371 (c)(1),
(2) Date: Nov. 5, 2021

(87) PCT Pub. No.: WO2021/085578
PCT Pub. Date: May 6, 2021

(65) Prior Publication Data
US 2022/0366577 A1  Nov. 17, 2022

(30) Foreign Application Priority Data

Oct. 31, 2019 (JP) .............................. JP2019-198201

(51) Int. Cl.
*G06T 7/277* (2017.01)
*G06T 7/246* (2017.01)
(Continued)

(52) U.S. Cl.
CPC .............. *G06T 7/277* (2017.01); *G06T 7/13* (2017.01); *G06T 7/246* (2017.01); *G06T 7/73* (2017.01);
(Continued)

(58) Field of Classification Search
CPC .. G06T 7/13; G06T 7/73; G06T 7/246; G06T 7/277; G06T 2207/30224;
(Continued)

(56) References Cited

U.S. PATENT DOCUMENTS

| | | | | |
|---|---|---|---|---|
| 2005/0233815 | A1* | 10/2005 | McCreary | A63B 71/06 473/131 |
| 2018/0043229 | A1 | 2/2018 | Stemle | |
| 2020/0269097 | A1* | 8/2020 | Legg | A63B 47/021 |

FOREIGN PATENT DOCUMENTS

| | | |
|---|---|---|
| JP | 4-347181 A | 12/1992 |
| JP | 2004-248725 A | 9/2004 |

(Continued)

OTHER PUBLICATIONS

Japanese Office Action in corresponding Patent Application No. 2019-198201, dated Jan. 28, 2021, with English translation.
(Continued)

*Primary Examiner* — Kenny A Cese
(74) *Attorney, Agent, or Firm* — Renner, Otto, Boisselle & Sklar, LLP

(57) ABSTRACT

The prediction control part 204 predicts a three-dimensional position and a three-dimensional velocity of the world coordinate system of the flying ball at a specific time after the initial time as a predicted position and a predicted velocity based on initial position and initial velocity of flying ball, and an equation indicating a parabolic shape of the flying ball. The conversion control part 205 converts the predicted position into a two-dimensional position of a camera coordinate system as a temporary position. The acquisition control part 206 specifies a flying ball image and acquires a two-dimensional position of the camera coordinate system of the flying ball image as an observation position. The correction control part 207 corrects the predicted position and the predicted velocity as a corrected position and a corrected velocity based on the predicted position and the predicted velocity, the observation position, and a Kalman filter.

10 Claims, 18 Drawing Sheets

(51) Int. Cl.
*G06T 7/73* (2017.01)
*G06T 7/13* (2017.01)
*G01S 5/16* (2006.01)

(52) U.S. Cl.
CPC ............. *G01S 5/16* (2013.01); *G01S 2205/08* (2020.05); *G06T 2207/30224* (2013.01); *G06T 2207/30241* (2013.01); *G06T 2207/30244* (2013.01)

(58) Field of Classification Search
CPC . G06T 2207/30241; G06T 2207/30244; G01S 5/16; G01S 2205/08
USPC ......................................................... 382/103
See application file for complete search history.

(56) References Cited

FOREIGN PATENT DOCUMENTS

| | | |
|---|---|---|
| JP | 2006-505292 A | 2/2006 |
| JP | 2008-545194 A | 12/2008 |
| JP | 2010-540036 A | 12/2010 |
| JP | 2014-508625 A | 4/2014 |
| JP | 2017-119102 A | 7/2017 |

OTHER PUBLICATIONS

Japanese Final Office Action in corresponding Patent Application No. 2019-198201, dated Jun. 17, 2021, with English translation.
Japanese Decision of Patent in corresponding Patent Application No. 2019-198201, mailing date Sep. 2, 2021, with English translation.
International Search Report and Written Opinion of the International Searching Authority for corresponding International Patent Application No. PCT/JP2020/040735, dated Jan. 12, 2021.
Takahashi, Masaki et al., Development of ball trajectory visualization system "B-Motion", ITE Technical Report, Feb. 4, 2005, vol. 29, No. 9, p. 119-124, ISSN 1342-6893, with English translation.
Takahashi, Masaki et al., Full automation of a method for the extraction of flying golf balls from video, Proceedings of 2007 IEICE General Conference, Mar. 7, 2007 p. 160 ISSN 1349-1369, with English translation.
Takahashi, Masaki et al., Tee shot trajectory visualization in live golf programs using object extraction and motion estimation, ITE Technical Report, Jul. 28, 2006, vol. 30, No. 41, p. 17-20, ISSN 1342-6893, with English translation.

\* cited by examiner

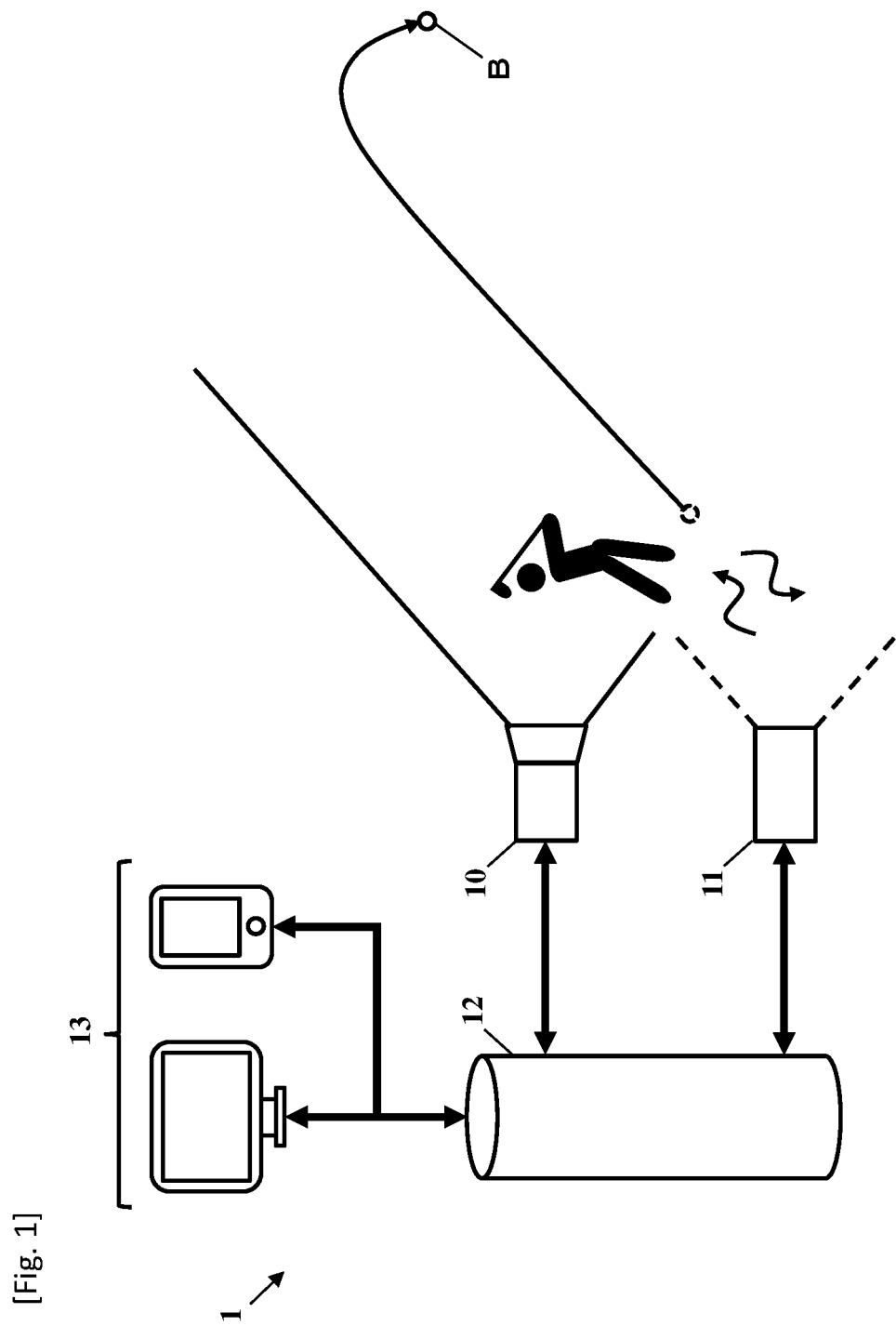
[Fig. 1]

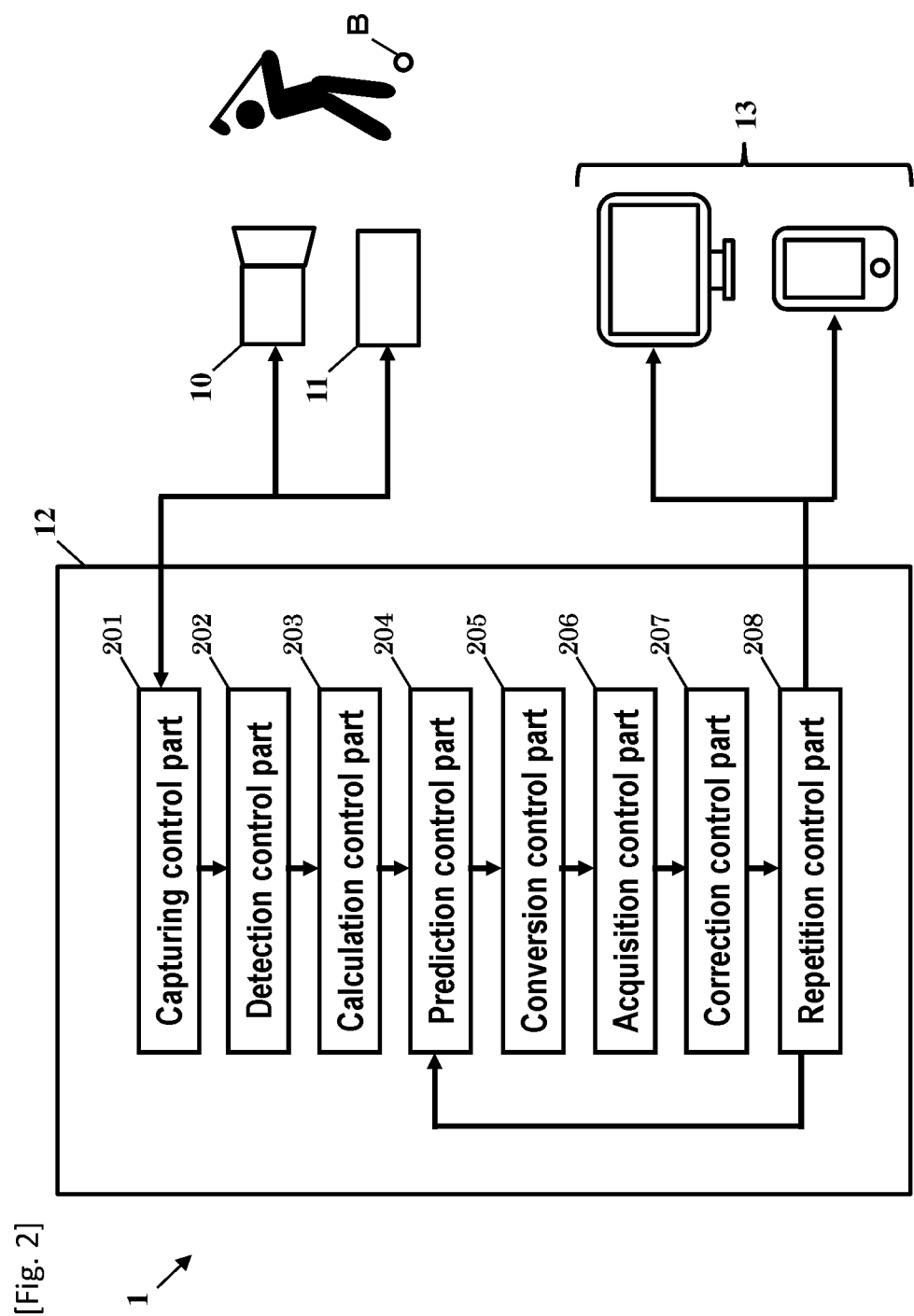
[Fig. 2]

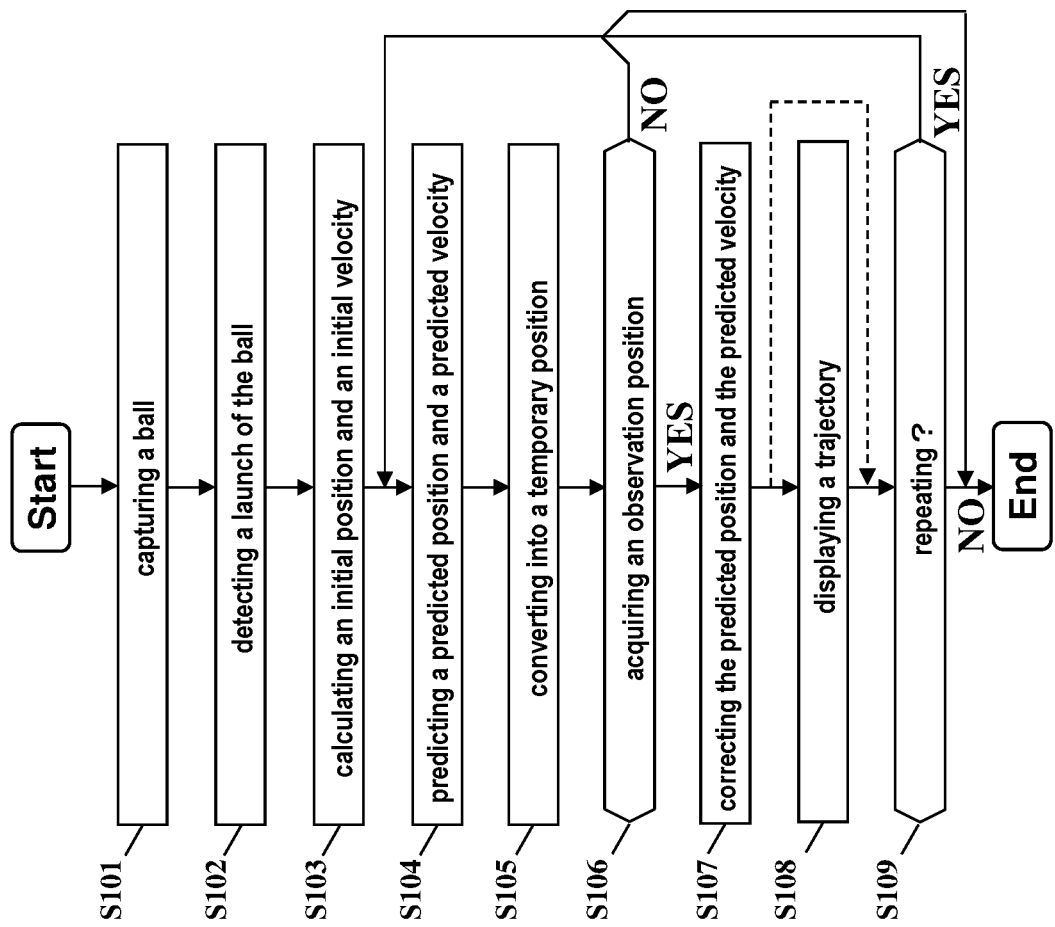
[Fig. 3]

[Fig. 4]
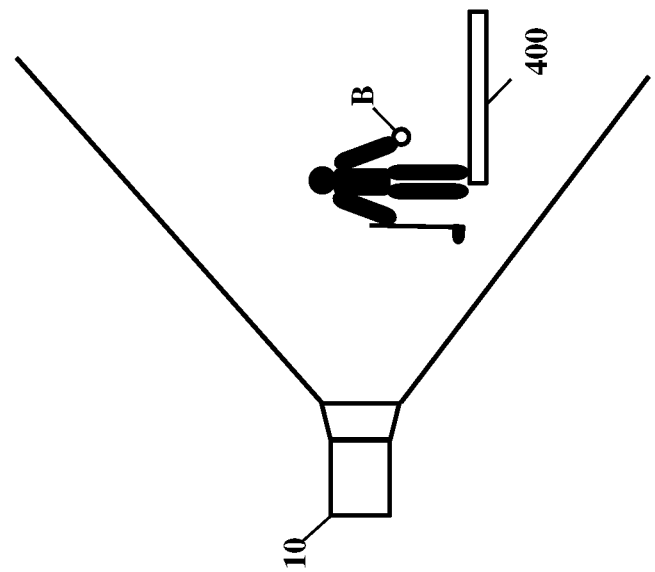
A
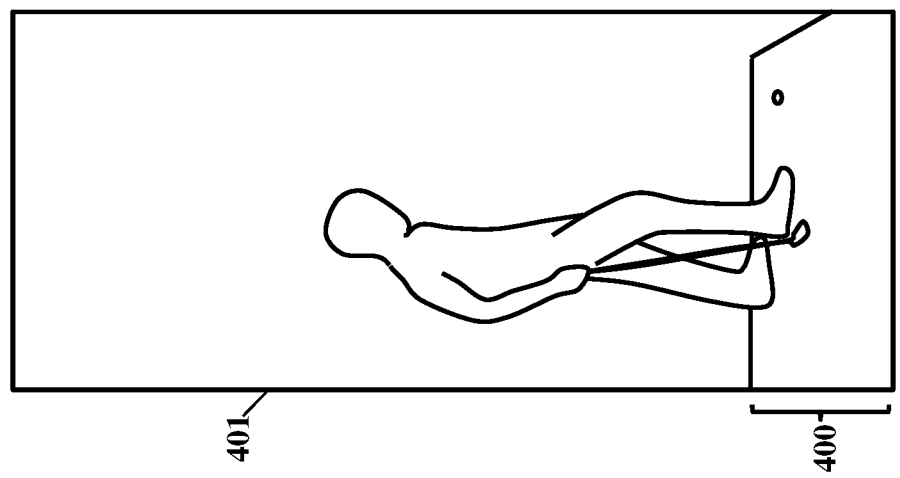
B

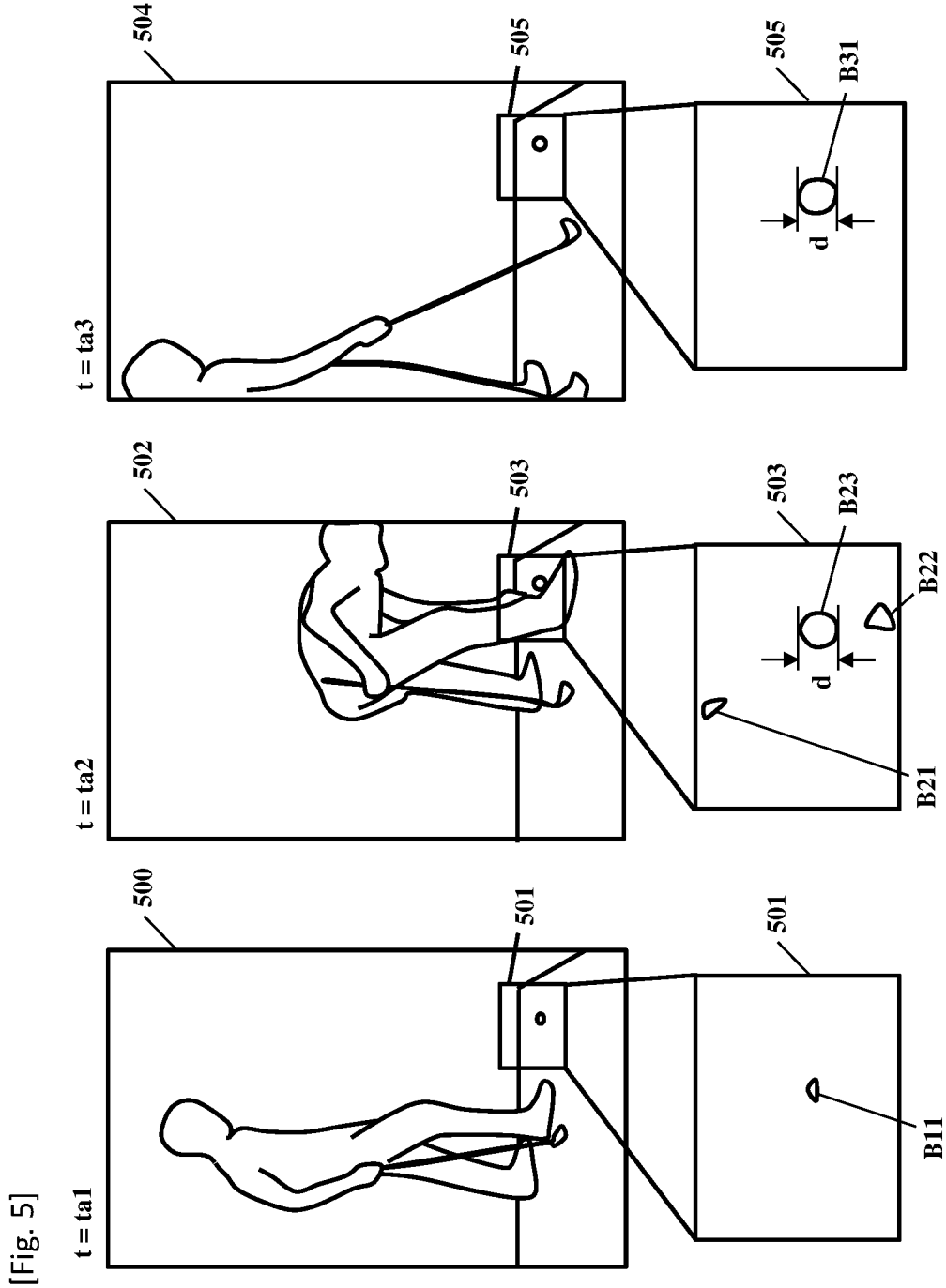

[Fig. 6]
A
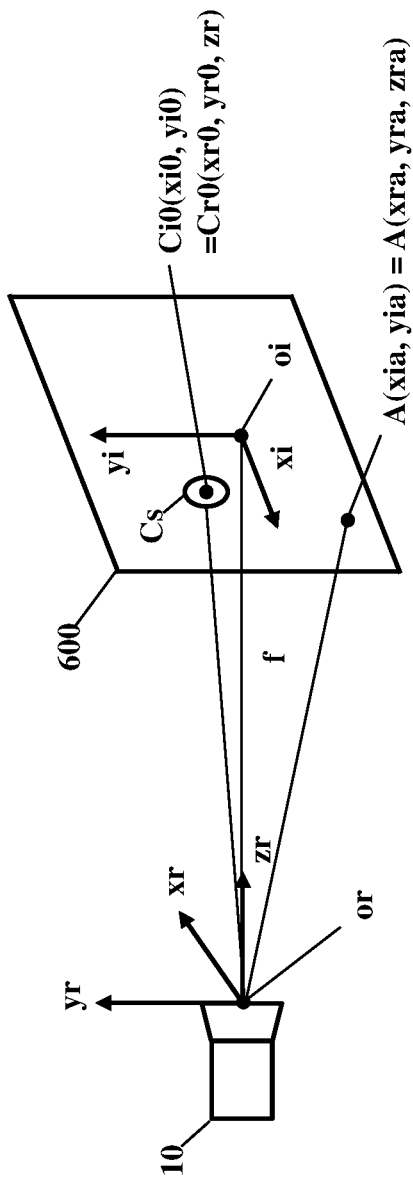
B
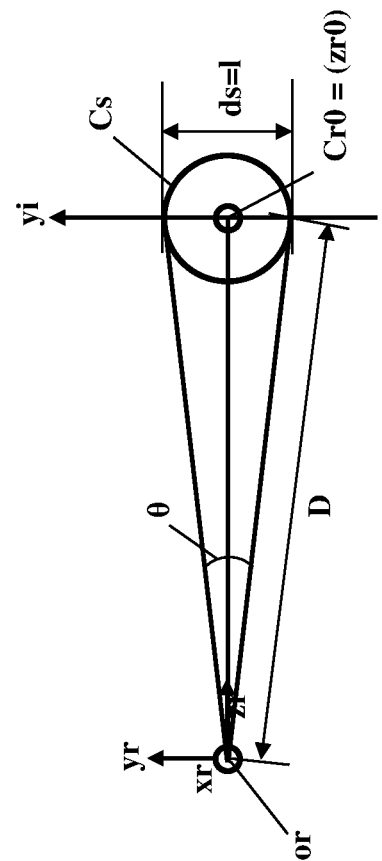

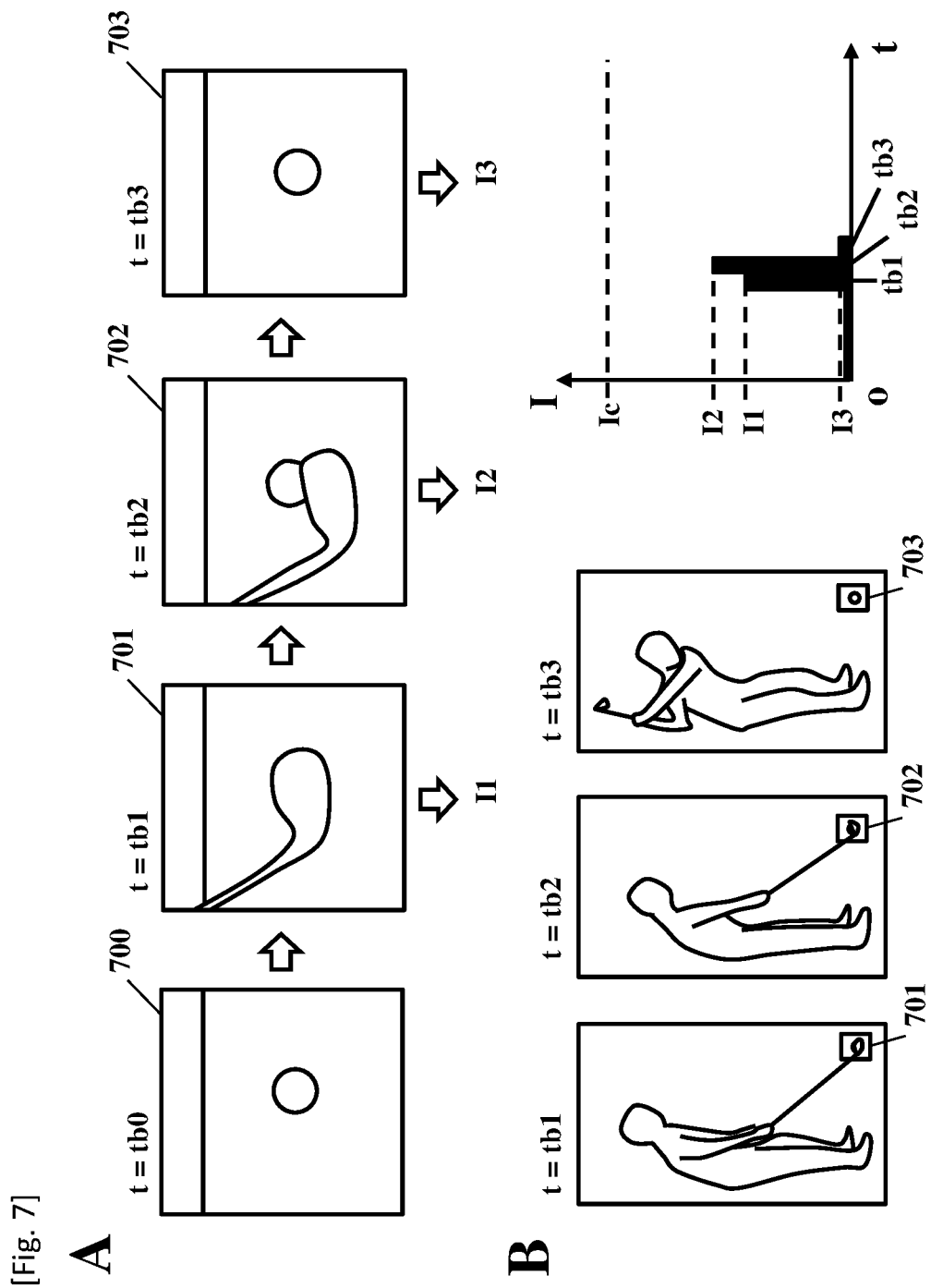

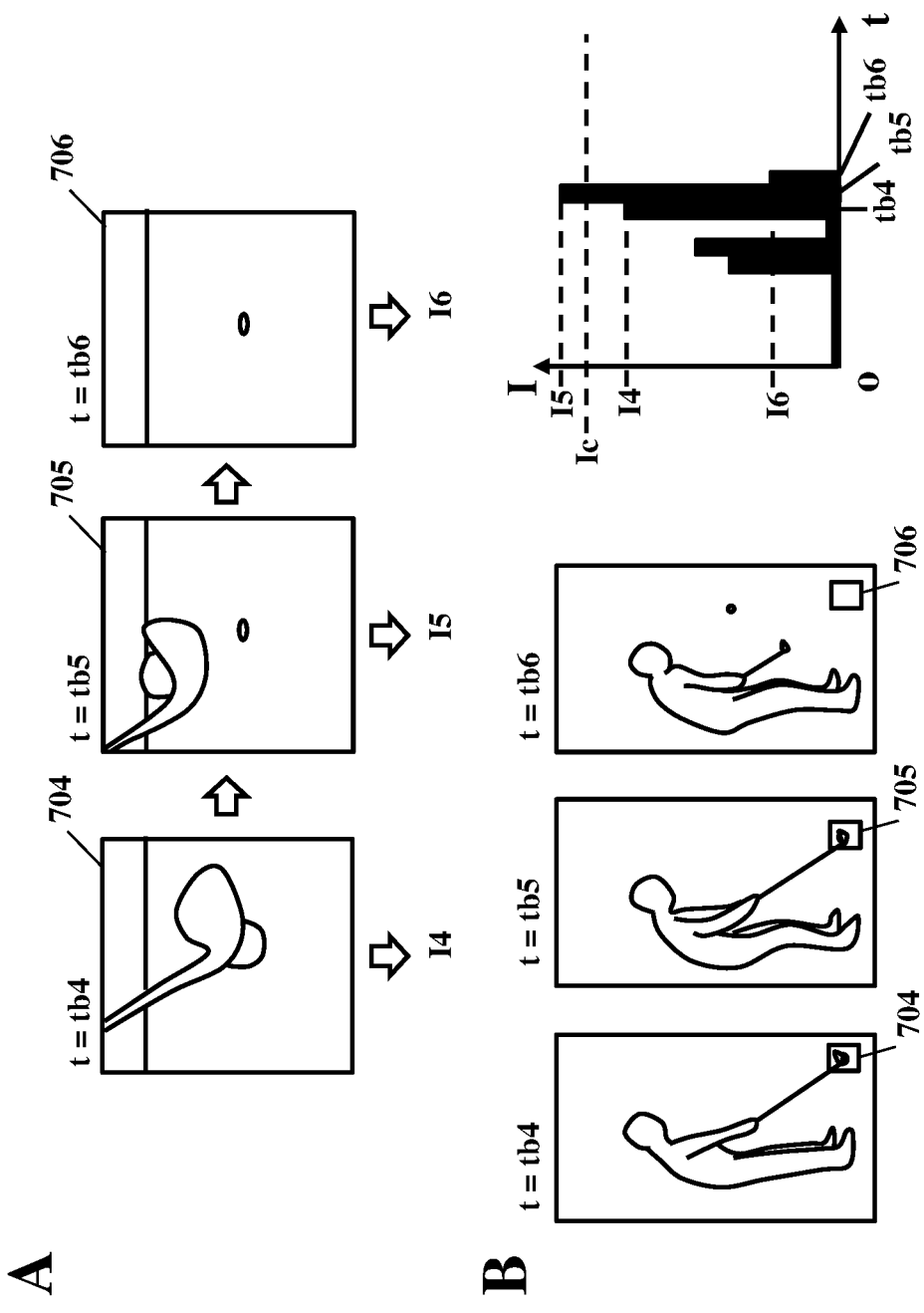
[Fig. 8]

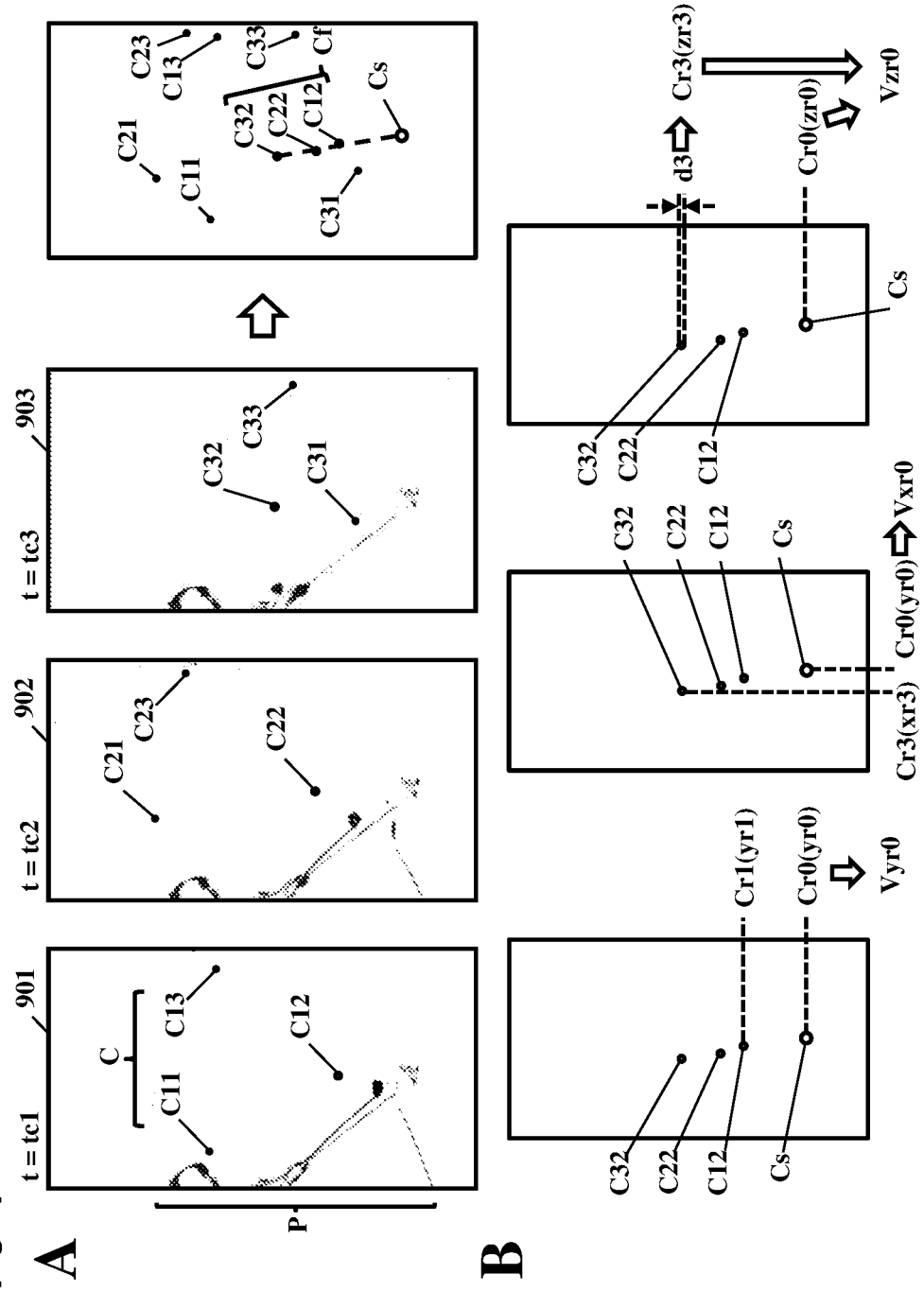

[Fig. 10]
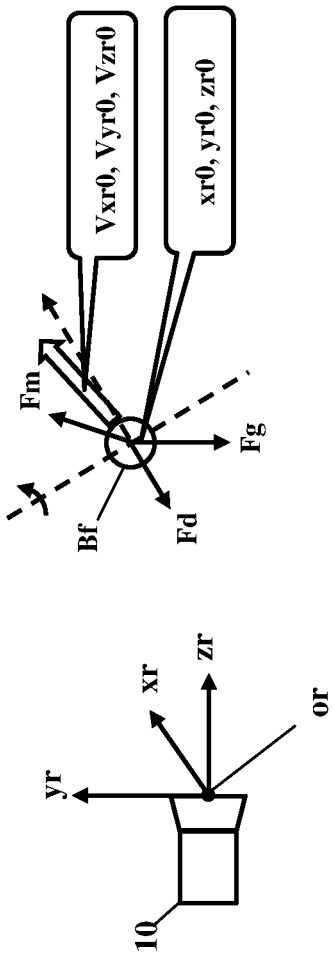
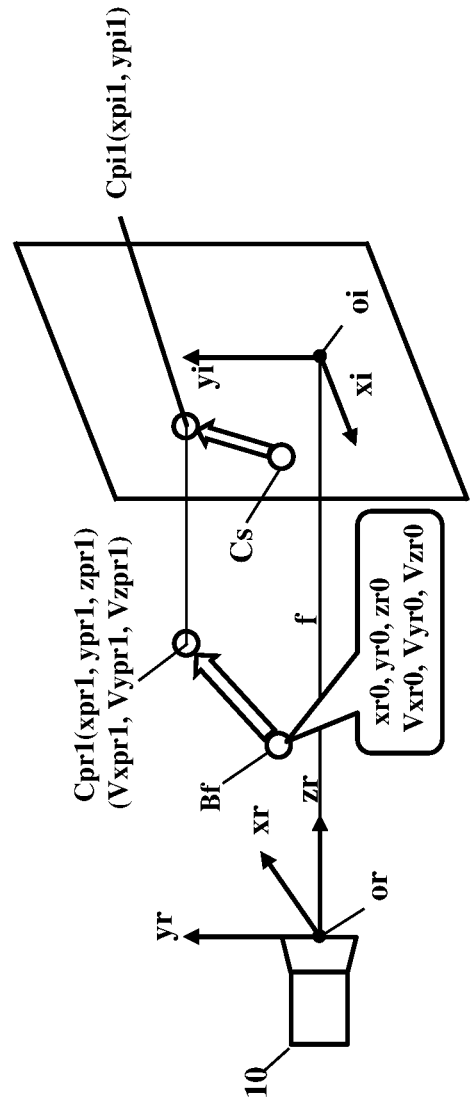

[Fig. 11]
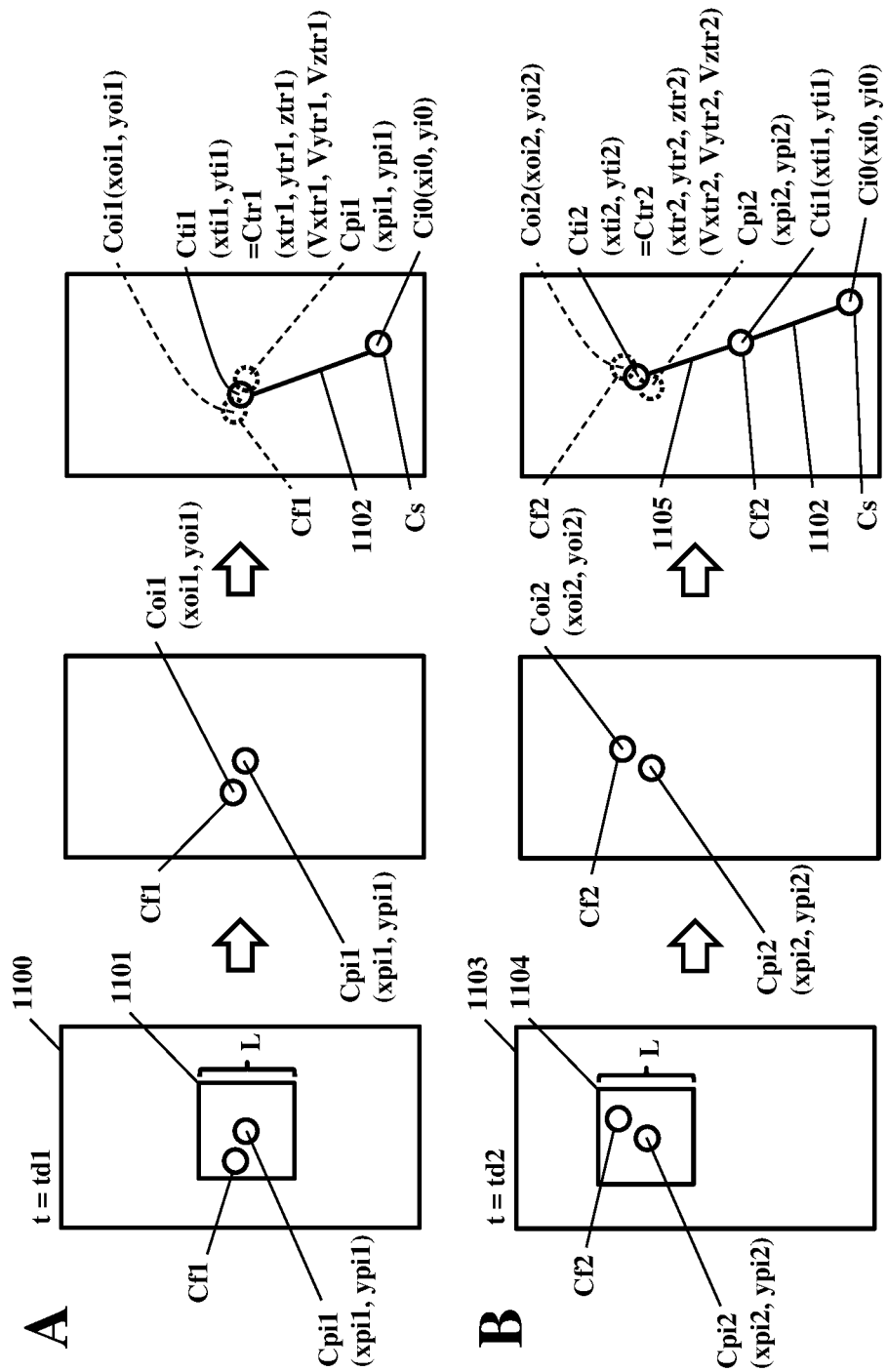

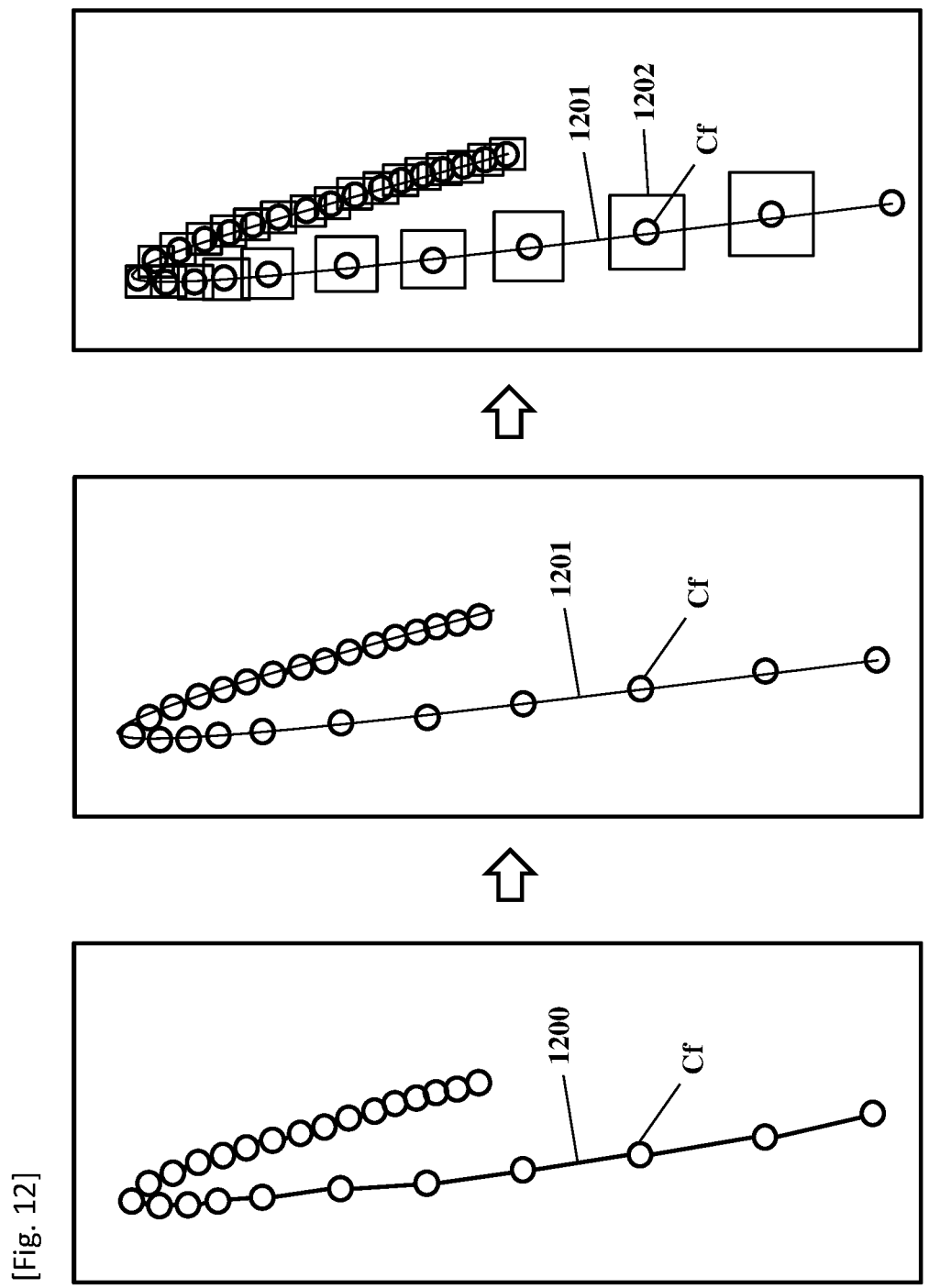
[Fig. 12]

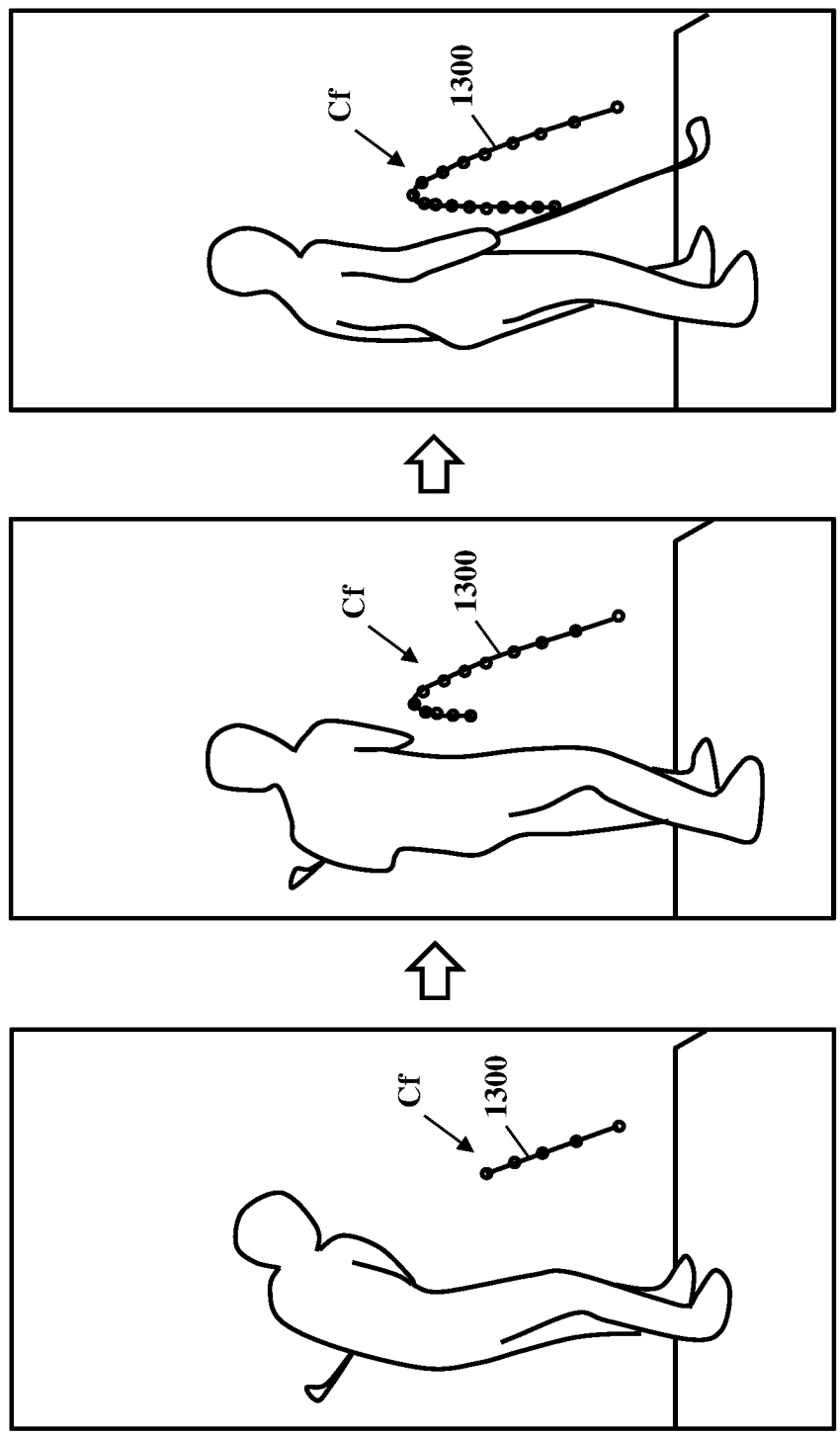
[Fig. 13]

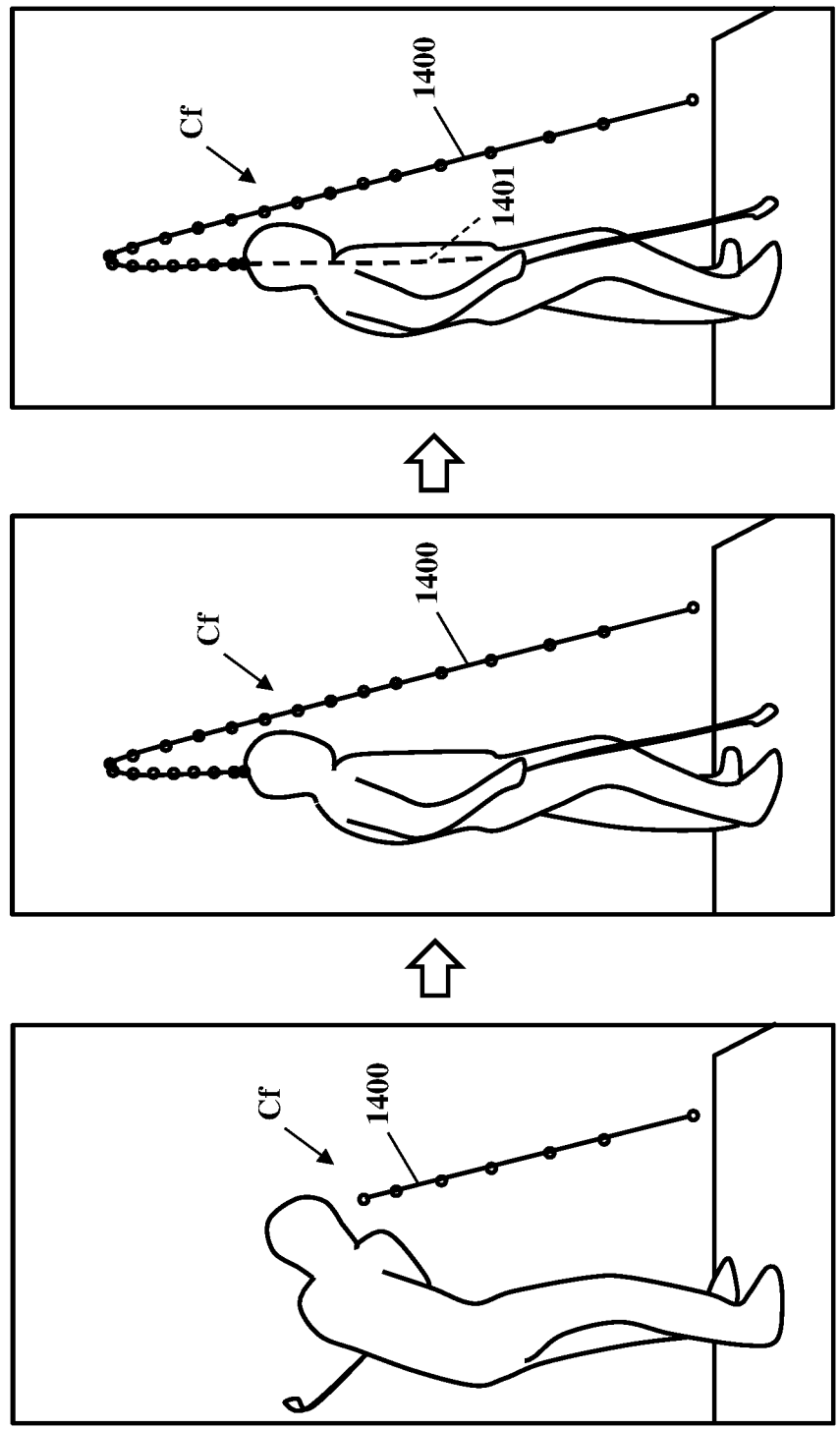
[Fig. 14]

[Fig. 15]
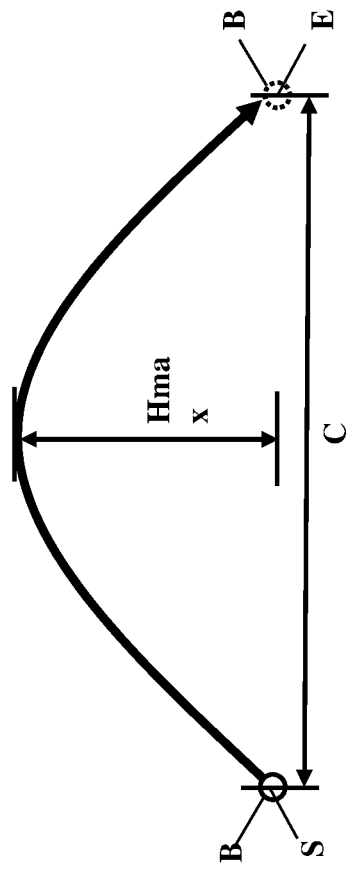
A
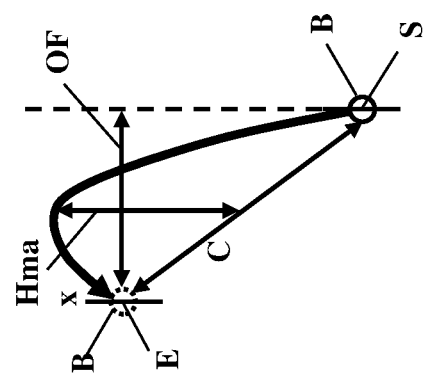
B

[Fig. 16]
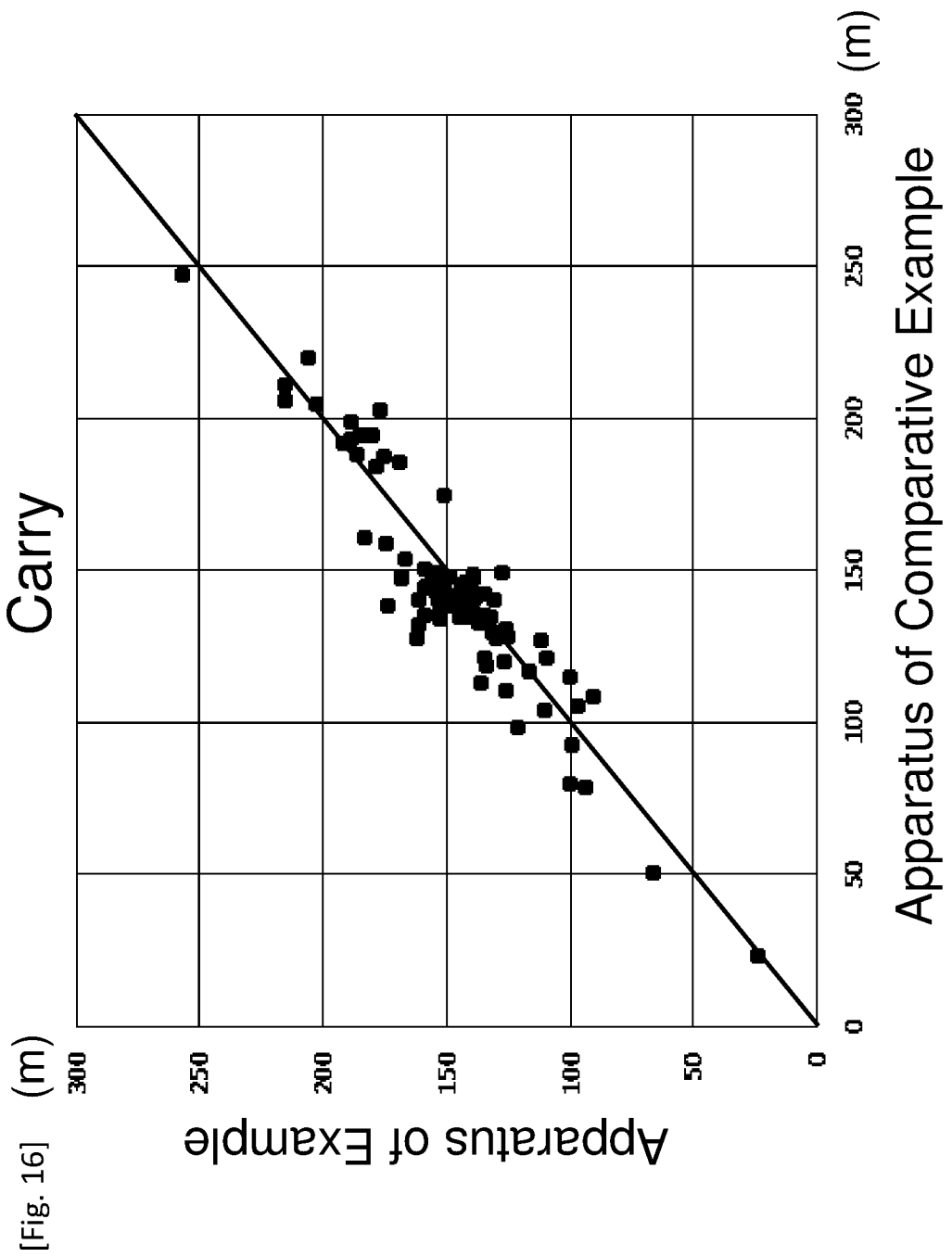

[Fig. 17]
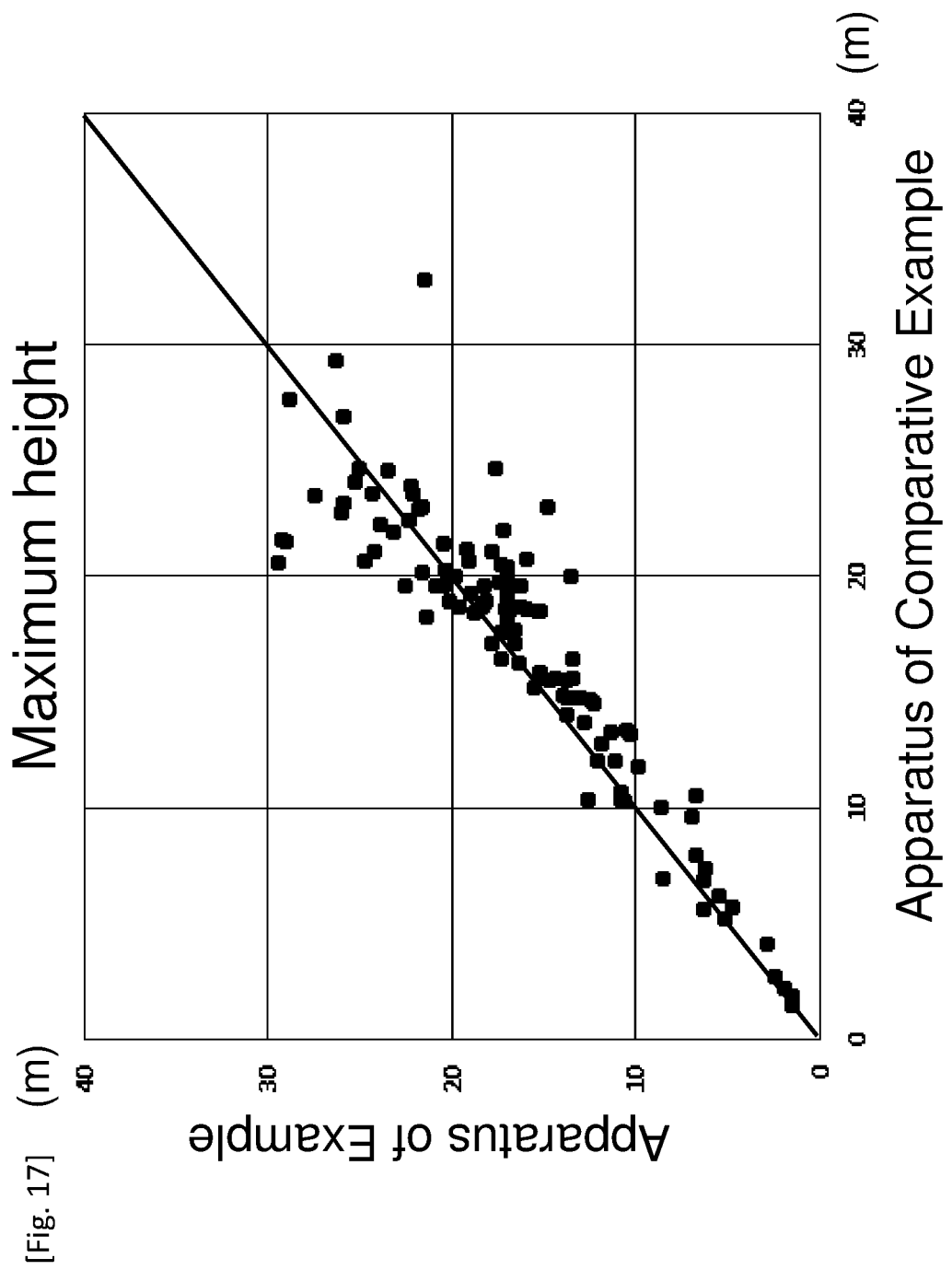

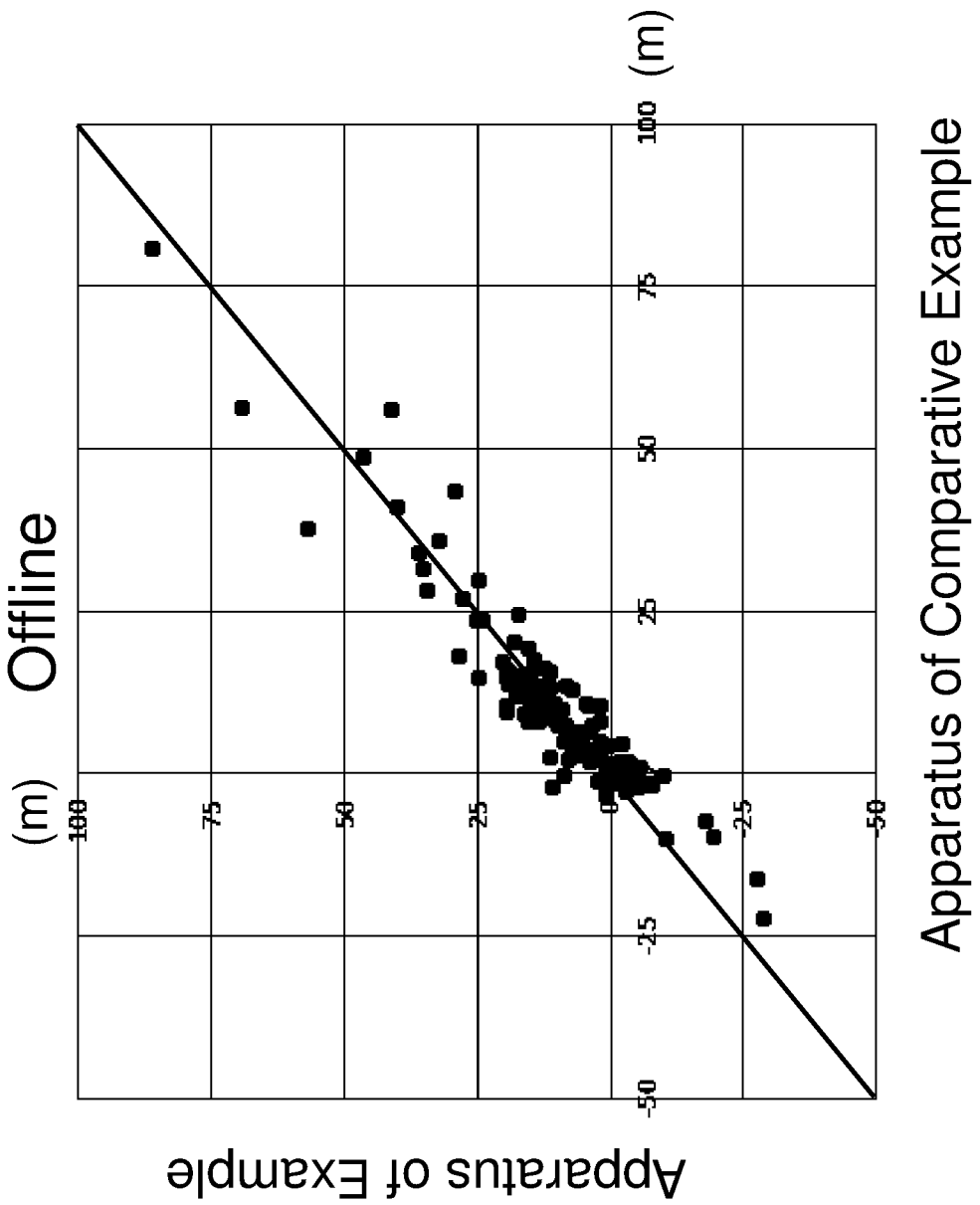
[Fig. 18]

BALL TRACKING APPARATUS AND BALL TRACKING METHOD

This application is a national phase of International Application No. PCT/JP2020/040735 filed Oct. 30, 2020, which claims priority to Japanese Patent Application No. 2019-198201 filed Oct. 31, 2019, in the Japan Patent Office, which are hereby incorporated herein by reference.

TECHNICAL FIELD

The present invention relates to a ball tracking apparatus and a ball tracking method.

BACKGROUND ART

About ball games such as golf, baseball, soccer, basketball and the like, there are techniques for continuously capturing a flying ball and calculating a trajectory of the ball. For example, Patent Literature 1 discloses a system that generates a video signal representing a sports scene in which a ball moves in front of a basically fixed background for at least a certain period of time. Patent Literature 2 discloses a system for collecting and analyzing ball trajectory and golf-related data such as launch angle, ball speed, ball spin and the like. Patent Literature 3 discloses a sensing device used in a virtual golf simulation device.

Patent Literature 4 discloses a golf striking training and simulation method that applies a ground image unit and a wind speed data of a wind speed measurement to orbit model using a Kalman filter. Patent Literature 5 discloses an analysis device for hitting a ball, the device capturing an image of a moment of hitting and an image before and after the image from an image captured by a high-speed camera device, and generating a composite image from the captured image. Patent Literature 6 discloses a method of capturing and analyzing an image of a golf ball for measuring various parameters related to a golf shot, the parameters including backspin and sidespin of a golf ball.

Nonpatent literature 1 discloses a ball tracking system that applies only two-dimensional position coordinates of a ball image to a Kalman filter. Nonpatent literature 2 and 3 disclose a ball tracking system that applies coordinates and an area of a ball image as observed amounts to a Kalman filter.

CITATION LIST

Patent Literature

PTL 1: Japanese Unexamined Patent Application Publication (Translation of PCT Application) No. 2008-545194
PTL 2: Japanese Unexamined Patent Application Publication (Translation of PCT Application) No. 2010-540036
PTL 3: Japanese Unexamined Patent Application Publication (Translation of PCT Application) No. 2014-508625
PTL 4: Japanese Unexamined Patent Application Publication No. Hei 04-347181
PTL 5: Japanese Unexamined Patent Application Publication No. 2004-248725
PTL 6: Japanese Unexamined Patent Application Publication (Translation of PCT Application) No. 2006-505292

Nonpatent Literature

NPL 1: Masaki Takahashi, Development of Ball Trajectory Visualization System "B-Motion", ITE technical report Vol. 29 No. 9, Japan, The Institute of Image Information and Television Engineers, Feb. 4, 2005, Volume 29, pp. 119-124,
NPL 2: Masaki Takahashi, PROCEEDINGS OF THE 2007 IEICE GENERAL CONFERENCE, Apr. 2, 2007, pp 160,
NPL 3: Masaki Takahashi, Tee shot trajectory visualization inlive golf programs using object extraction and motion estimation, ITE technical report Vol. 30 No. 41, The Institute of Image Information and Television Engineers, Sep. 13, 2006, pp. 17-20,

SUMMARY OF INVENTION

Technical Problem

Usually, a launching and flying ball is captured behind a ball game player in real time. At that time, there is a demand for an apparatus that calculates a trajectory of the flying ball and flight parameters (for example, carry, velocity, direction, etc.) of the ball.

However, in an outdoor environment, various noises such as digital noise like hardware noise, electrical noise like image noise, and dynamic noise like movement of people, movement of trees, and other golf shots are generated. Since a light condition of the ball during capturing in the outdoor environment are not stable, it is very difficult to detect a launching ball and track flying ball.

Especially in golf, a golf ball is small and a golf launch (shot) is very fast (>120 mph). It is difficult to continuously see and track the golf ball in the sky, and it is easy that the golf ball gets out of a field of view of a camera. Also, golf ball flight models are extremely diverse and complex. From such a fact, there is a problem that it is difficult to accurately calculate the trajectory of a flying ball.

The technique described in Patent Document 1 determines ball candidates while discarding ball candidates that are not found within a threshold range from track line candidates. Thus, when a trajectory of a flying ball launching draws a curve, there is a problem that it is difficult to accurately calculate the trajectory of the ball.

The technique described in Patent Document 2 requires two or more cameras and a combination of orbital lines obtained from two different spatiotemporal points. Thus, if the combination is inappropriate, there is a problem that an error occurs in the trajectory of the flying ball after the launch.

The technique described in Patent Document 3 analyzes a two-dimensional trajectory based on two-dimensional coordinates converted from three-dimensional coordinates of a ball candidate. Thus, there is a problem that there is a limit in calculating a three-dimensional trajectory of an actual ball from a two-dimensional trajectory of ball image.

The technique described in Patent Document 4 requires wind speed data in the Kalman filter. Thus, there is a problem that wind sensor unit is required. The technique described in Patent Document 5 calculates a trajectory of a golf ball using a speed, a launch angle, and a flight distance of the golf ball at the first stage. The technique described in Patent Document 6 calculates a launch angle and a spin rate of a golf ball at the first stage. Thus, there is a problem that a trajectory of the golf ball cannot be calculated over time, and the trajectory of the golf ball cannot be accurately calculated.

The technique described in Nonpatent literature 1 uses only the two-dimensional position coordinates to the Kalman filter. Similarly, there is a problem that there is a limit in calculating the three-dimensional trajectory of an actual ball from the two-dimensional trajectory of ball image. The technique described in Nonpatent literature 2 and 3 applies coordinates and an area of a ball image as observed amounts to the Kalman filter. This utilizes the fact that the area of the ball image is proportional to the flight distance of the ball. However, when the flight distance of the ball becomes long distance, the area of the ball image is not proportional to the flight distance of the ball. Thus, similarly, there is a problem that there is a limit in calculating the three-dimensional trajectory of an actual ball from the two-dimensional trajectory of ball image.

Accordingly, the present invention was created as a solution for the problems and aims at providing a ball tracking apparatus and a ball tracking method that can accurately calculate a trajectory of a flying ball after a launch.

Solution to Problem

A ball tracking apparatus in the present invention includes a capturing control part, a detection control part, a calculation control part, a prediction control part, a conversion control part, an acquisition control part, a correction control part, and a repetition control part. The capturing control part captures a ball with a camera. The detection control part detects a launch of the ball. The calculation control part calculates a three-dimensional position and a three-dimensional velocity of a world coordinate system of a flying ball at an initial time when the launch of the ball is detected as an initial position and an initial velocity. The prediction control part predicts a three-dimensional position and a three-dimensional velocity of the world coordinate system of the flying ball at a specific time after the initial time as a predicted position and a predicted velocity based on the calculated initial position and the calculated initial velocity of the flying ball, and an equation indicating a parabolic shape of the flying ball. The conversion control part converts the predicted position of the flying ball into a two-dimensional position of a camera coordinate system in a captured image captured at the specific time as a temporary position. The acquisition control part specifies a flying ball image indicating the flying ball in the captured image at the specific time based on the converted temporary position in the captured image, and acquires a two-dimensional position of the camera coordinate system of the specified flying ball image as an observation position. The correction control part corrects the predicted position and the predicted velocity of the flying ball as a corrected position and a corrected velocity based on the predicted position and the predicted velocity of the flying ball, the observation position of the flying ball image, and a Kalman filter. The repetition control part calculates a trajectory of the flying ball by repeating the prediction, the conversion, the acquisition, and the correction with using the correction position and the correction velocity of the flying ball at the specific time.

A ball tracking method in the present invention includes a capturing control step, a detection control step, a calculation control step, a prediction control step, a conversion control step, an acquisition control step, a correction control step, and a repetition control step, like each part of the ball tracking apparatus.

Advantageous Effects of Invention

According to the present invention, the present invention can accurately calculate a trajectory of a flying ball after a launch.

BRIEF DESCRIPTION OF DRAWINGS

FIG. 1 is an outline diagram indicating ball tracking apparatus according to the present invention.

FIG. 2 is a functional block diagram indicating ball tracking apparatus according to the present invention.

FIG. 3 is a flowchart indicating execution steps of ball tracking apparatus according to the present invention.

FIG. 4A is an outline diagram indicating an example when a camera captures an area around a bat mat.

FIG. 4B is a captured image indicating an example when the camera captured the area around the bat mat.

FIG. 5 is a figure indicating an example of a captured image and an in-region image when a player prepares for a swing after placing a ball in a predetermined place.

FIG. 6A is an outline diagram indicating a relationship between a camera coordinate system of the captured image and a world coordinate system of the camera.

FIG. 6B is an outline diagram when calculating a z coordinate value of the world coordinate system of the ball.

FIG. 7A is a figure indicating an example of a reference image, a comparison image, and an one-dimensional value for each of comparison images when the player places the golf club in front of the ball and swings the golf club up.

FIG. 7B is a figure indicating an example of continuous captured image and a graph of a time-dependent change of a one-dimensional value when the player places the golf club in front of the ball and swings the golf club up.

FIG. 8A is a figure indicating an example of a reference image, a comparison image, and a one-dimensional value for each of comparison images when the player actually launches the ball with the golf club.

FIG. 8B is a figure indicating an example of continuous captured image and a graph of a time-dependent change of a one-dimensional value when the player actually launches the ball with the golf club.

FIG. 9A is a figure indicating an example of a detection of a difference image of a flying ball immediately after a launch and a candidate image of a flying ball, and a determination of a straight line.

FIG. 9B is a figure indicating an example when calculating a velocity of the world coordinate system of a flying ball immediately after a launch.

FIG. 10A is an outline diagram indicating an example of the world coordinate system of the camera and forces acting on the flying ball.

FIG. 10B is an outline diagram indicating an example when converting a position of the flying ball in the world coordinate system of the camera to a position of the flying ball image in the camera coordinate system of a captured image.

FIG. 11A is an outline diagram indicating an example of a correction of a position and a velocity of the flying ball at the first time and a connection line.

FIG. 11B is an outline diagram indicating an example of a correction of a position and a velocity of the flying ball at the second time and the connection line.

FIG. 12 is an outline diagram indicating an example of a connecting line that connects flying ball images over time, a trajectory of a curved flying ball, and a display of a search range.

FIG. 13 is an outline diagram indicating an example of a trajectory of the flying ball when a maximum height of the ball launched by the player at the golf club is low.

FIG. 14 is an outline diagram indicating an example of a trajectory of the flying ball when a maximum height of the ball launched by the player at the golf club is high.

FIG. 15A is an outline diagram indicating an example of carry and maximum height of flight parameters.

FIG. 15B is an outline diagram indicating an example of offline of flight parameters.

FIG. 16 is a graph of a measurement result of carry of a golf ball measured by a flight parameter measuring apparatus of comparative example and a ball tracking apparatus of example.

FIG. 17 is a graph of a measurement result of maximum height of the golf ball measured by the flight parameter measuring apparatus of comparative example and the ball tracking apparatus of example.

FIG. 18 is a graph of a measurement result of offline of the golf ball measured by the flight parameter measuring apparatus of comparative example and the ball tracking apparatus of example.

DESCRIPTION OF EMBODIMENTS

The preferred embodiments of the present invention will be explained below according to the attached drawings; thereby the present invention will be clearly un-derstood. The embodiments below are examples materializing the present invention, and do not limit the technical scope of the present invention.

As shown in FIG. 1, a ball tracking apparatus 1 of the present invention includes an image capturing device 10, a launch detection device 11, an analysis device 12, and a display device 13. For example, the image capturing device 10 is a high-performance camera that enables continuous capturing at high speed with high resolution. The present invention basically includes one camera 10, and may include a plurality of (for example, two) cameras 10.

The launch detection device 11 is appropriately designed according to a method of detecting a launch of a ball. For example, when detecting a ball launch with using an image, the launch detection device 11 includes a camera. When including a camera, the launch detection device 11 may be provided separately from the camera 10 or may also serve as the camera 10. When detecting a ball launch with using microwave, the launch detection device 11 includes a microwave detection device. For example, the microwave detection device includes a transmitter that emits microwaves, a receiver that receives reflected waves reflected by a ball, and a Doppler sensor that generates a Doppler signal having a Doppler frequency due to the reflected waves.

The analysis device 12 is communicably connected to the image capturing device 10, and when receiving a captured image captured by the image capturing device 10, the analysis device 12 calculates a trajectory of the ball B after a launch. The analysis device 12 is communicably connected to the launch detection device 11, when receiving information detected by the launch detection device 11, the analysis device 12 detects a launch of the ball B, and calculates an initial position and an initial velocity of a flying ball B after the launch.

The display device 13 is communicably connected to the analysis device 12 and displays a trajectory of the ball B calculated by the analysis device 12 on a screen. The display device 13 may also serve as the analysis device 12. A terminal device or a mobile terminal device in which the analysis device 12 and the display device 13 may be integrated.

Here, a configuration of the image capturing device 10, the launch detection device 11, the analysis device 12, and the display device 13 is not particularly limited. For example, all the devices may be a mobile terminal device with a camera. Or the image capturing device 10 and the launch detection device 11 may be a device at a site where the ball B launches, and the analysis device 12 may be a cloud on the network, and the display device 13 may be used as a mobile terminal device that the player carries to the site.

The image capturing device 10, the launch detection device 11, the analysis device 12, and the display device 13 have a built-in CPU (GPU), ROM, RAM, etc. (not shown), and the CPU uses the RAM as a work area, and executes program stored in the ROM or the like. Further, each part described later is also realized by the CPU executing the program.

As referring to FIGS. 2 and 3, a configuration and an execution steps in an embodiment of the present invention are explained. First, when a player turns on a power of a ball tracking apparatus 1, the ball tracking apparatus 1 is activated, and a capturing control part 201 of the ball tracking apparatus 1 starts capturing a place where a ball will launch by using a camera 10. (FIG. 3: S101).

In the case of golf, as shown in FIG. 4A, the camera 10 is directed to a bat mat 400 on which the golf ball B is placed. Thus, as shown in FIG. 4B, the capturing control part 201 captures an area around the bat mat 400, and acquires a captured image 401. When the capturing control part 201 starts capturing, the detection control part 202 of the ball tracking apparatus 1 detects a launch of the ball B (FIG. 3: S102).

The method of detection by the detection control part 202 is appropriately designed according to a type of the launch detection device 11. When the launch detection device 11 is a camera, the detection control part 202 analyzes an image of the ball B, and detects the launch of the ball B by detecting a disappearance of a stop ball image after detecting the stop ball image showing the ball B stopped for a predetermined time.

For example, as shown in FIG. 5, the detection control part 202 acquires a predetermined in-region image 501 of the captured image 500 at the specific first time (ta1) at a stop detection stage of the ball B. The in-region image 501 means an in-region image in which the ball B is to be placed. Next, the detection control part 202 extracts an edge image of the in-region image 501 by using a method such as an edge enhancement processing, an edge detection processing, or the like and acquires an extracted edge image. The edge enhancement process may be a Retiex process. The edge detection process includes a EDPF (Edge Draw Parameter Free) process, a Sobel process, a Canny process or the like.

Next, the detection control part 202 detects circular images showing a circle or an ellipse in the extracted edge image as temporary stop ball candidate images by using an image processing such as an arc detection processing. The number of temporary stop ball candidate images is not limited to one. The arc detection process includes a LSD (Line Segment Detector), a Hough transform, or the like.

Then, the detection control part 202 detects a temporary stop ball candidate image having a diameter d equivalent to a predetermined reference diameter ds(pixels) as a temporary stop ball image. The reference diameter ds means a diameter of the ball image showing the ball B at a predetermined position (for example, the bat mat) in the in-region image 501. In this way, the temporary stop ball image is limited to one.

For example, in the captured image 500 at the first time (ta1), since the player has not yet placed the ball at a predetermined place, the detection control part 202 detects a temporary stop ball candidate image B11 corresponding to a shape of a golf tee in the in-region image 501 after image processing. Since the temporary stop ball candidate image B11 does not have a diameter d equivalent to the reference diameter ds, the detection control part 202 cannot detect the temporary stop ball candidate image B11 as a temporary stop ball image, and analyzes a captured image 502 at the second time (ta2) next to the first time (ta1).

In the captured image 502 at the second time (ta2), since the player placed the ball B at the predetermined position, the detection control part 202 detects temporary stop ball candidate images B21 and B22 related to the player's leg, and a temporary stop ball candidate image B23 corresponding to the ball B in the in-region image 503 after the image processing. Since the temporary stop ball candidate image B23 corresponding to the ball B has a diameter d equivalent to the reference diameter ds in these temporary stop ball candidate images B21, B22, and B23, the detection control part 202 detects the temporary stop ball candidate image B23 as a temporary stop ball image at the second time (ta2).

When detecting the temporary stop ball image B23, the detection control part 202 sets the detected temporary stop ball image B23 as a reference ball image, sets a predetermined score to an initial value (for example, "1"), and analyzes a captured image 504 at the third time (ta3) next to the second time (ta2). The score means the number of times that the position of the detected temporary stop ball image is equivalent.

In the captured image 504 at the third time (ta3), since the player moved to prepare for a swing, the detection control part 202 detects a temporary stop ball candidate image B31 corresponding to the ball B placed at the same place in the in-region image 505 after the image processing. Since the temporary stop ball candidate image B31 has a diameter d equivalent to the reference diameter ds, the detection control part 202 detects a temporary stop ball candidate image B31 as a temporary stop ball image at the third time (ta3).

Then, the detection control part 202 sets the detected temporary stop ball image B31 as a detection ball image B31, and determines whether or not a position of the detection ball image B31 is equivalent to a position of the reference ball image B23. For example, the detection control part 202 determines whether or not a two-dimensional center position of a camera coordinate system of the detection ball image B31 is included in a predetermined range including a two-dimensional center position of the camera coordinate system of the reference ball image B23. For example, the predetermined range is a range having a predetermined width centered on the two-dimensional center position of the camera coordinate system of the reference ball image B23.

When the position of the detection ball image B31 is equivalent to the position of the reference ball image B23, the detection control part 202 adds one time to the score. Then, the detection control part 202 repeats a detection of a new temporary stop ball image by using captured image taken over time after the detection time {second time (ta2)} when the temporary stop ball image is detected, until the score ("2") after addition exceeds the predetermined threshold (for example, "3").

If the position of the detected ball image is not equivalent to the position of the reference ball image before the score exceeds the threshold, the ball B in a real space has moved for some reason. Thus, the detection control part 202 erases the reference ball image and starts over from the detection of the temporarily stop ball image. When the score exceeds the threshold, the detection control part 202 determines that the temporarily stop ball image is in a stopped state, and detects the detected ball image as a stop ball image. In this way, it is possible to detect a stop ball B in the real space by repeating the analysis of captured images over time based on the score.

When detecting the stop ball image, the detection control part 202 calculates a three-dimensional position (coordinates) (length) of a world coordinate system of the stop ball B by using a two-dimensional position (pixels) of the camera coordinate system of the stop ball image, a diameter (pixels) of the stop ball image, and a calibration matrix information of the camera 10.

As shown in FIG. 6A, the calibration matrix information of the camera 10 means an information associated a two-dimensional position (xia, yia) (pixels) of the camera coordinate system of an arbitrary point A on the captured image 600 having the center of of the captured image 600 corresponding to a focal length f (length) of the camera 10 as the origin, with a three-dimensional position (xra, yra, zra) (length) of the world coordinate system of the arbitrary point A having the center or of the camera 10 as the origin. The calibration matrix information includes a K matrix information and a P matrix information. The captured image 600 is placed perpendicular to a z-axis at a position remoted by the focal length f (length) in the z-axis direction from the center or of the camera 10 toward an object to be captured. The camera coordinate system is a coordinate system in which the center of the captured image 600 is the origin, a horizontal axis is a x-axis (xi), and a vertical axis is a y-axis (yi). The world coordinate system is a coordinate system in which the center or of the camera 10 is the origin, a horizontal axis is a x-axis (xr), a vertical axis is a y-axis (yr), and a depth axis (field-of-view axis) is a z-axis (zr).

The detection control part 202 converts a two-dimensional center position Ci0 (xi0, yi0) of the camera coordinate system of the stop ball image Cs to a three-dimensional center position Cr0 (xr0, yr0, zr0) of the world coordinate system by using the calibration matrix information. As shown in FIG. 6B, by a following equations (1) and (2), the law of cosine is established in a distance l between both left and right ends of the stop ball image Cs of the captured image 600 (diameter ds of the stop ball image Cs), a distance D between the center or of the camera 10 in the world coordinate system and a left end (or a right end) of the stop ball image Cs of the captured image 600, and an angle θ between the left and right ends of the stop ball image Cs of the captured image 600 in the z-axis direction on basis of the center or of the camera 10 in the world coordinate system.

$$l^2 = D^2 + D^2 - 2D^2 \cos\theta = 2D^2(1-\cos\theta) \qquad (1)$$

$$D = SQR[l^2/\{2*(1-\cos\theta)\}] \qquad (2)$$

The detection control part 202 converts the diameter ds of the stop ball image Cs from the pixel to the length using a predetermined scale for converting a length (actual size) from a pixel, calculates the angle θ (degrees) between the both left and right ends of the stop ball image Cs of the captured image 600 in the z-axis direction from the diameter ds (length) of the converted stop ball image Cs and the focal length f (length) of the camera 10, and calculates the distance D (length) by substituting l (length) of the stop ball image Cs and the angle θ (degree) into the equation (2). Since the distance D (length) approximates a z coordinate value (zr0) of the world coordinate system of the stop ball image Cs, the detection control part 202 sets the calculated distance D (length) to a z coordinate value (zr0) of the world coordinate system of the ball image Cs.

The detection control part 202 detects a launch of the ball B by detecting a disappearance of the stop ball image Cs in the captured images over time after the stop time (tb0) when the stop ball image Cs is detected. Specifically, as shown in FIG. 7A, the detection control part 202 acquires an in-region image 700 of the captured image captured at the stop time (tb0) as a reference image in a detection stage of a disappearance of the stop ball B, and acquires an in-region image 701 of the captured image captured at the first time (tb1) next to the stop time (tb0). Next, the detection control part 202 subtracts the reference image 700 from the comparison image 701 using a difference calculation method, and calculates a difference. The difference calculation method may include a background subtraction method. The background subtraction method is a method of detecting an object appearing or disappearing in a background image by comparing a background image (reference image) acquired in advance with an observation image (comparison image) acquired next.

The detection control part 202 detects a disappearance of the stop ball image Cs based on a variation of the calculated difference. For example, the detection control part 202 converts the calculated difference into a one-dimensional value I (−), and determines whether or not the converted one-dimensional value I exceeds a predetermined launch reference value Ic (−).

The launch reference value Ic is appropriately designed based on a difference between an in-region before and after the launch (shot) of the ball B. For example, a first one-dimensional value Ia (−) corresponding to a difference between an in-region image immediately before the player placed the golf club in front of the ball and an in-region image immediately after the player placed the golf club, and a second one-dimensional value Ib (−) corresponding to a difference between an in-region image immediately before the player launched the ball with the golf club and an in-region image immediately after the player launched the ball are calculated in advance. The launch reference value Ic is set between the first one-dimensional value Ia and the second one-dimensional value Ib.

As shown in FIGS. 7A and 7B, when the player places the golf club in front of the ball B and swings the golf club up, the detection control part 202 sets an in-region image 701 at the next first time (tb1) to a comparison image, calculates a one-dimensional value I1 corresponding to a difference obtained by subtracting the comparison image 701 with the reference image 700, and determines whether or not the one-dimensional value I1 exceeds the launch reference value Ic. Similarly, the detection control part 202 calculates and determines one-dimensional values I2 and I3 for an in-region image 702 at the second time (tb2) next to the first time (tb1) and an in-region image 703 at the third time (tb3) next to the second time (tb2) respectively. In this case, since the player has not launched the ball at the golf club, the calculated one-dimensional values I1, I2, and I3 do not exceed the launch reference value Ic, respectively.

As shown in FIGS. 8A and 8B, when the player actually launches the ball B at the golf club, similarly, the detection control part 202 calculates and determines one-dimensional values I4, I5, and I6 for an in-region images 704, 705, and 706 at the fourth time (tb4), the fifth time (tb5) and the sixth time (tb6) after the third time (tb3) respectively. A specific one-dimensional value I5 in the calculated one-dimensional values I4, I5, and I6 exceeds the launch reference value Ic. Therefore, the detection control part 202 detects a disappearance of the stop ball image Cs at the fifth time (tb5) corresponding to the one-dimensional value I5 that exceeds the launch reference value Ic.

As described above, although it depends on the player's operating conditions, about one-dimensional values Ik at kth times (tbk) (k=1, 2, 3, , , , ) after the stop time (tb0), two peaks may occur due to the operation of the player's golf club. Therefore, the detection control part 202 may create a graph in which a first axis is the one-dimensional value Ik at the kth time (tbk) and a second axis is the kth time (tbk) after the stop time (tb0), and calculate a maximum value Imax of a peak of the graph by applying a peak analysis process to the graph. The detection control part 202 may determine whether or not the calculated maximum value Imax exceeds the launch reference value Ic. The peak analysis process, for example, includes a mixed Gauss model (Gaussian Mixture Model).

As described above, the case where the launch detection device 11 is the camera has been described, when the launch detection device 11 is a microwave detection device, the detection control part 202 may receive a Doppler signal corresponding to the launch of the ball B by using the microwave detection device 10, and detect the launch of the stop ball B based on a fluctuation of the Doppler signal.

When the detection control part 202 detects the launch of the ball B, a calculation control part 203 of the ball tracking apparatus 1 calculates a three-dimensional position and a three-dimensional velocity of the world coordinate system of a flying ball at an initial time when the launch of the ball is detected as an initial position and an initial velocity (FIG. 3: S103).

The method that the calculation control part 203 calculates is appropriately designed according to a type of the launch detection device 11. When the launch detection device 11 is a camera, the calculation control part 203 calculates the initial position and the initial velocity of the flying ball Bf by analyzing the captured image of the flying ball Bf. Specifically, the calculation control part 203 sets a captured image captured at the initial time (tc0) {for example, the fifth time (tb6)} when the launch of the stop ball B is detected as a reference image, and sets a captured image captured at the first time (tc1) next to the initial time (tc0) as a comparison image. As shown in FIG. 9A, the calculation control part 203 calculates a difference image 901 obtained by subtracting the reference image from the comparison image. The difference image 901 at the first time (tc1) shows a swing image P of the player and a flying ball image C after the launch.

Next, the calculation control part 203 detects an edge image from the difference image 901 by using a method such as the edge enhancement processing or the edge detection processing, calculates an occupied area S1 that the detected edge image occupies. The calculation control part 203 calculates a minimum circle image including the edge image by applying the least square method of a circle or an ellipse to the edge image, and calculates a minimum occupied area S2 of the minimum circle image. Then, the calculation control part 203 calculates a division value Ra (−) obtained by dividing the minimum occupied area S2 from the occupied area S1, and determines whether or not the calculated division value Ra is within a range of an initial ball reference value R0 (−). The initial ball reference value R0 means a reference value corresponding to a flying ball candidate image being a possibility of the flying ball Bf. When the edge image is a perfect circle image, the division value Ra (−) is about 1.0 (−). So, the initial ball reference value R0 corresponding to the circle image showing a circle or an ellipse is set to a range of from 0.9 (−) to 1.1 (−). When the division value Ra is within the range of the initial ball reference value R0, the calculation control part 203 extracts an edge image in which the division value Ra is within the range as a flying ball candidate image. Then, the calculation control part 203 repeats the extraction of flying ball candidate images for difference images at a predetermined number (here, for example, 3) after the initial time (tc0). The predetermined number is set to a number capable of determining a straight line indicating the flight path of the flying ball Bf described later.

Here, as shown in FIG. 9A, the calculation control part 203 extracts three flying ball candidate images C11, C12, and C13 from a difference image 901 at the first time (tc1), extracts three flying ball candidate images C21, C22, and C23 from a difference image 902 at the second time (tc2) next to the first time (tc1), and extracts three flying ball candidate images C31, C32, and C33 from a difference image 903 at the third time (tc3) next to the second time (tc2).

Then, the calculation control part 203 specifies flying ball candidates image existing on or near a straight line over time in the flying ball candidate images extracted at each time after the initial time (tc0) as flying ball images. There is one flying ball candidate image existing on the straight line at each time. The calculation control part 203 discards flight ball candidate images not existing on the straight line over time.

For example, as shown in FIG. 9A, when extending straight lines from each of flying ball candidate images C11, C12, and C13 at the first time (tc1) to each of flying ball candidate images C21, C22, and C23 at the second time (tc2), and extending straight lines from each of flying ball candidate images C21, C22, and C23 to each of flying ball candidate images C31, C32, and C33 at the third time (tc3), the calculation control part 203 specifies a flying ball candidate image C12 at the first time (tc1), a flying ball candidate image C22 at the second time (tc2), and the flying ball candidate image C32 at the third time (tc3) that exist on or near a straight line 904 in the order of the first time (tc1), the second time (tc2), and the third time (tc3) as flying ball images Cf. In this way, even if a flying ball Bf is small and flies quickly like a golf ball, the flying ball Bf in the initial stage after the launch constitutes a flight path on a straight line, so that feature is utilized, it is possible to specify the flying ball image Cf efficiently. The calculation control part 203 may add the stop ball image Cs to the flying ball candidate image extracted at each time, and specify flying ball candidate images existing on a straight line over time from the stop ball image Cs as a flying ball image Cf.

The calculation control part 203 calculates an initial position by using a three-dimensional center position Cr0 (xr0, yr0, zr0) of the stop ball image Cs at the initial time (tc0). And the calculation control part 203 calculates an initial velocity of the flying ball Bf at the initial time (tc0) based on the specified flying ball image Cf. First, since a y-coordinate value of the y-axis in a three-dimensional position of the flying ball Bf immediately after the initial time (tc0) changes rapidly, the calculation control part 203 calculates an initial velocity (Vyr0) on the y-axis by using flying ball images Cf with a short time interval in times after the initial time (tc0). For example, as shown in FIG. 9B, the calculation control part 203 substitutes a y coordinate value (yr0) of a three-dimensional center position Cr0 of the stop ball image Cs at the initial time (tc0) and a y-coordinate value (yr1) of a three-dimensional center position Cr1 of the flying ball image C12 at the first time (tc1) closest to the initial time (tc0) into a following equation (3), and calculates an initial velocity (Vyr0) of the y-axis.

$$Vyr0=\{(yr1-yr0)*dr\}/(dp*dt) \quad (3)$$

Here, dr is a diameter of the ball (mm), dp is a diameter of the ball (pixels) in the captured image, and dt is an interval (sec) between the initial time (tc0) and the first time (tc1).

Since a x-coordinate value of a x-axis of the three-dimensional position of the ball B immediately after the initial time (tc0) changes slowly, the calculation control part 203 calculates an initial velocity of the x-axis (Vxr0) by using flying ball images Cf with a long time interval. For example, as shown in FIG. 9B, the calculation control part 203 substitutes a x-coordinate value (xr0) of the three-dimensional center position Cr0 of the stop ball image Cs at the initial time (tc0) and a x-coordinate value (xr3) of a three-dimensional center position Cr3 of the flying ball image C32 at the third time (tc3) being a long time since the initial time (tc0) into a following equation (4), and calculates an initial velocity (Vxr0) of the x-axis.

$$Vxr0=\{(xr3-xr0)*dr\}/(dp*dt) \quad (4)$$

dt is an interval (sec) between the initial time (tc0) and the third time (tc3).

Since a z-coordinate value of a z-axis of the three-dimensional position of the ball B immediately after the initial time (tc0) is calculated from the diameter (pixels) of the flying ball image Cf as described above, It is preferable to adopt the flying ball image C32 that the time interval is long. The calculation control part 203 calculates an initial velocity (Vzr0) of the z-axis by using the flying ball image C32 with a long time interval. For example, as shown in FIG. 9B, the calculation control part 203 acquires a diameter (d3) of the flying ball image C32 at the third time (tc3) being a long time since the initial time (tc0), and calculates a z coordinate value (zr3) of the three-dimensional center position Cr3 of the flying ball image C32 at the third time (tc3) by using the above equations (1) and (2). The calculation control part 203 substitutes a z-coordinate value (zr0) of the three-dimensional center position Cr0 of the stop ball image Cs at the initial time (tc0) and the z-coordinate value (zr3) of the three-dimensional center position Cr3 of the flying ball image C32 into a following equation (5), and calculates an initial velocity (Vzr0) of the z-axis.

$$Vzr0=(zr3-zr0)/dt \quad (5)$$

dt is an interval (sec) between the initial time (tc0) and the third time (tc3).

In the above, the three-dimensional center position Cr0 (xr0, yr0, zr0) of the stop ball image Cs at the initial time (tc0) is used as the initial position, but a three-dimensional center of the flying ball image C12 at the first time (tc1) next to the initial time (tc0) may be used as the initial position. In that case, the three-dimensional center position Cr1 (xr1, yr1, zr1) of the flying ball image C12 at the first time (tc1) becomes the initial position, and the flying ball images C22 and C32 after the second time (tc2) are used.

In the above, the case where the launch detection device 11 is a camera has been described, but when the launch detection device 11 is a microwave detection device, the calculation control part 203 may receive a Doppler signal after the ball B launches immediately by using the microwave detection device 11, detect an initial velocity of the flying ball Bf based on the Doppler signal. If the initial position of the flying ball Bf cannot be calculated only by the microwave detection device 11, the calculation control part 203 may combine the microwave detection device 11 with a camera and calculate the initial position of the flying ball Bf by analyze images.

When the calculation control part 203 finishes the calculation, a prediction control part 204 of the ball tracking apparatus 1 predicts a three-dimensional position and a three-dimensional velocity of the world coordinate system of a flying ball Bf at a specific time (td1) after the initial time (td0) as a predicted position and a predicted velocity based on the calculated initial position and the calculated initial velocity of the flying ball Bf, and an equation indicating a parabolic shape of the flying ball Bf (FIG. 3: S104).

The method of prediction by the prediction control part 204 is not particular limited. As shown in FIG. 10, a force F (N) acting on the flying ball Bf in the world coordinate system can be expressed by a following equation (6).

$$F = Fd + Fm + Fg \tag{6}$$

Here, Fd (N) is an air resistance force, is proportional to the square of a flying velocity of the flying ball Bf and acts in a direction opposite to a flying direction of the flight ball Bf. Fm (N) is a Magnus force acting on the flying ball Bf by Magnus effect, is proportional to an outer product of the flying velocity and a spin velocity of the flying ball Bf, and acts in the same direction as a spin direction of the flying ball Bf. Fg (N) is a gravity and acts downward on the flying ball Bf.

A derivative of the velocity of the flying ball Bf (dV/dt) [in other words, an acceleration a {m/(s*s)}] from Fd, Fm, and Fg acting on the flying ball Bf can be expressed by a following equation (7).

[Math. 1]

$$\frac{dV}{dt} = \frac{F}{m} = -\frac{1}{2m} C_d \rho A \|V\| V + \frac{1}{2m} C_m \rho A r \omega \times V + g \tag{7}$$

Here, m (kg) is a weight of the flying ball Bf, Cd is a coefficient of air resistance, p is a density of the air, and A is a front projected area of the flying ball Bf. V=(Vxr, Vyr, Vzr) is a three-dimensional velocity of the flying ball Bf, Cm is a coefficient of Magnus force, r (m) is a radius of the flying ball Bf, and ω=(ωx, ωy, ωz) is a three-dimensional spin velocity of the flying ball Bf. In the initial state, ω=(ωx, ωy, ωz)=(0, 0, 0). g is a gravity acceleration.

Based on the equation (7), the equation indicating the parabolic shape of the flying ball Bf can be expressed by a following equation (8).

[Math.2]

$$\begin{bmatrix} x(k+1) \\ y(k+1) \\ z(k+1) \\ Vx(k+1) \\ Vy(k+1) \\ Vz(k+1) \end{bmatrix} = \begin{bmatrix} x(k) \\ y(k) \\ z(k) \\ Vx(k) \\ Vy(k) \\ Vz(k) \end{bmatrix} + \begin{bmatrix} Vx(k) \\ Vy(k) \\ Vz(k) \\ -k_d\|V(k)\|Vx(k) + k_m\{\omega y Vz(k) - \omega z Vy(k)\} \\ -k_d\|V(k)\|Vy(k) + k_m\{\omega z Vx(k) - \omega x Vz(k)\} \\ -k_d\|V(k)\|Vz(k) + k_m\{\omega x Vy(k) - \omega y Vx(k)\} - g \end{bmatrix} T, \tag{8}$$

kd is (−1/2m) CdρA, km is (1/2m) CmρAr, and T is a capturing time interval.

As shown in FIG. 10B, the prediction control part 204 predicts a three-dimensional center position Cpr1 (xpr1, ypr1, zpr1) and a three-dimensional velocity (Vzpr1, Vypr1, Vzpr1) of the flying ball Bf at the first time (td1) next to the initial time (td0) by substituting the initial position Cr0 (xr0, yr0, zr0) and the initial velocity (Vxr0, Vyr0, Vzr0) of the flying ball Bf into the equation (8). The initial time (td0) means a time when the initial position Cr0 (xr0, yr0, zr0) and the initial velocity (Vxr0, Vyr0, Vzr0) of the flying ball Bf are calculated. For example, an interval between the initial time (td0) and the first time (td1) is set to the capturing time interval T.

In the above, the three-dimensional position and the three-dimensional velocity of the flying ball Bf are predicted by using the equation (8) in which three kinds of forces F are considered, but a simple equation may be used for the prediction. The simple equation may include a normal parabolic formula in which gravity Fg is considered.

When the prediction control part 204 finishes the prediction, a conversion control part 205 of the ball tracking apparatus 1 converts the predicted position of the flying ball Bf into a two-dimensional position of a camera coordinate system in a captured image captured at the specific time (td1) as a temporary position (FIG. 3: S105).

The method of conversion by the conversion control part 205 is not particular limited. For example, an equation for converting the three-dimensional position (xr, yr, zr) of the world coordinate system into the two-dimensional position (xi, yi) of the camera coordinate system can be expressed by a following equations (9) and (10) by using a pinhole camera model.

$$xi = fx^*(xr/zr) + cx \tag{9}$$

$$yi = fy^*(yr/zr) + cy \tag{10}$$

fx is a focal distance of the camera in the x-axis direction in the camera coordinate system, fy is a focal distance of the camera in the y-axis direction in the camera coordinate system, cx is a x coordinate value of the center position of the camera 10 in the camera coordinate system, and cy is a y coordinate value of the center position of the camera 10 in the camera coordinate system.

The conversion control part 205 calculates a two-dimensional center position Cpi1 (xpi1, ypi1l), the position where a possibility of a presence of flying ball is high, in the captured image at a specific time (td1) as a temporary position by substituting the three-dimensional center position Cpr1 (xpr1, ypr1, zpr1) of the flying ball Bf at the predicted specific time (td1) into the equations (9) and (10).

When the conversion control part 205 finishes the conversion, an acquisition control part 206 of the ball tracking apparatus 1 specifies a flying ball image indicating the flying ball Bf in the captured image at the specific time (td1) based on the converted temporary position in the captured image, and acquires a two-dimensional position of the camera coordinate system of the specified flying ball image as an observation position (FIG. 3: S106).

The acquisition method of the acquisition control part 206 is not particularly limited. For example, the acquisition control part 206 determines a search range centered on the converted temporary position Cpi1 (xpi1, ypi1) in the captured image at the specific time (td1). For example, as shown in FIG. 11A, the search range 1101 has a square shape, the square shape centered on the temporary position Cpi1 (xip1, yip1) of the captured image 1100 at the specific time (td1)

and having a predetermined side L. The side L is appropriately set to a length greater than a diameter of the flying ball image. The search range may be a circle with a diameter of L.

Next, the acquisition control part 206 specifies a circular image Cf indicating a circle or an ellipse in the determined search range 1101 as a flying ball image. Specifically, as described above, the acquisition control part 206 detects an edge image in the determined search range 1101 by using a method such as an edge enhancement processing or an edge detection processing, and calculates a minimum circle image including the detected edge image. The acquisition control part 206 calculates a division value Rb (−) by dividing a minimum occupied area of the minimum circle image from an occupied area of the edge image, and specifies an edge image in which the division value Rb is within a range of the flying ball reference value R1 (−) and is closest to a circle reference value R2 (−) indicating a circle as a flying ball image. For example, the flying ball reference value R1 is set in a range of 0.9 (−) to 1.1 (−), and the circle reference value R2 is set to 1.0 (−). By the flying ball reference value R1 and the circle reference value R2, it is possible to specify a flying ball image closest to the flying ball Bf in the search range 1101. The acquisition control part 206 acquires a two-dimensional center position Coi1 (xo1, yoi1) of the specified flying ball image Cf1 as an observation position (FIG. 3: S106YES). As shown in FIG. 11A, by defining the search range 1101, it is possible to quickly and easily specify the flying ball image Cf1 at a specific time (td1). When there is no edge image whose division value Rb is within the range of the flying ball reference value R1, or when the edge image cannot be detected, it will be described later (FIG. 3: S106NO).

When the acquisition control part 206 finishes the acquisition, a correction control part 207 of the ball tracking apparatus 1 corrects the predicted position and the predicted velocity of the flying ball Bf as a corrected position and a corrected velocity based on the predicted position and the predicted velocity of the flying ball Bf, the observation position of the flying ball image Cf1, and a Kalman filter (FIG. 3: S107).

The Kalman filter means a linear probability system. Generally, when a true value is observed, a value different from the true value is obtained as an observed value under an influence of some error. The Kalman filter modifies a predicted value in order to make the predicted value closer to the true value based on the predicted value of a state model and a observed value of observation model. In the present invention, an equation of the state model can be expressed by a following equation (11).

$$x(k+1)=F(k)*x(k)+w(k) \quad (11)$$

k is a time coefficient, x (k+1) is a predicted value at k+1 after k, F (k) is a state parameter at k, x (k) is a state value at k, and w (k) is a process noise at k. In the present invention, F (k) corresponds to the equation indicating the parabolic shape of the flying ball Bf at k, x (k) corresponds to the three-dimensional position and the three-dimensional velocity at k, and x (k+1) corresponds to the predicted position and predicted velocity at k+1 after k.

An equation of the observation model can be expressed by a following equation (12).

$$y(k)=H(k)*x(k)+v(k) \quad (12)$$

y (k) is an observed value at k, H (k) is an observed parameter at k, x (k) is the state value at k, and v (k) is a process noise at k. In the present invention, H (k) corresponds to the equation for converting the three-dimensional position of the world coordinate system into the two-dimensional position of the camera coordinate system, and y (k) corresponds to the observation position at k.

The correction control part 207 first initializes by a following equation (13).

$$x0=E[x0] \quad (12)$$

$$P0=E[(x0-E[x0])(x0-E[x0]')] \quad (13)$$

E [x0] is a matrix of x0, P0 is a variance-covariance matrix, and E [x0]' is a transposed matrix of E [x0]. In the present invention, k is 0 {initial time (td0)}, and x0 corresponds to the initial position and initial velocity of the flying ball Bf.

A following equation (14) is the same as the above equation (7), but at k=1, the predicted position and the predicted velocity of the flying ball Bf at a specific time (td1) are calculated.

$$x(k)=F(k-1)*x(k-1) \quad (14)$$

x (k) at k=1 corresponds to the predicted position and the predicted velocity of the flying ball Bf at a specific time (td1).

The correction control part 207 calculates the correction position and the correction velocity at a specific time (td1) at k=1 by following equations (15)-(18).

$$P(k)=F(k-1)*P(k-1)*F(k-1)'+Q(k) \quad (15)$$

$$G(k)=P(k)*H(k)'/\{H(k)*P(k)*H(k)'+R(k)\} \quad (16)$$

$$Xc(k)=x(k)+G(k)*\{y(k)-H(k)*x(k)\} \quad (17)$$

$$P(k)=\{I-G(k)*H(k)\} \quad (18)$$

F (k−1)' is a transpose matrix of F (k−1), Q (k) is a covariance of w (k), H (k)' is a transpose matrix of H (k), R (k) is a covariance of v (k), xc (k) is a correction position and a correction velocity of the flying ball Bf at a specific time (td1) at k=1, and I is an identity matrix.

As shown in FIG. 11A, the correction control part 207 obtains a three-dimensional correction center position Ct1 (xtr1, ytr1, ztr1) and a three-dimensional correction velocity (Vxtr1, Vytr1, Vztr1) of the flying ball Bf that is close to the true value by using the Kalman filter. In FIG. 11A, the three-dimensional correction center position Ctr1 (xtr1, ytr1, ztr1) of the world coordinate system is converted to a two-dimensional correction center position Cti1 (xti1, yti1) of the camera coordinate system by using the equations (9) and (10).

As shown in FIG. 11A, the correction control part 207 displays a trajectory of the flying ball Bf by connecting the initial position Ci0 of the stop ball image Cs at the initial time (td0) and the two-dimensional correction position Cti1 of the flying ball image Cf1 at the specific time (td1) with a connecting line 1102 (FIG. 3: S108).

When the correction control part 207 finishes the correction, a repetition control part 208 of the ball tracking apparatus 1 calculates a trajectory of the flying ball after the specific time (td1) by repeating the prediction (S104), the conversion (S105), the acquisition (S106), and the correction (S107) with using the correction position and the correction velocity of the flying ball Bf at the specific time (td1) (FIG. 3: S109).

As a repetition condition, the repetition control part 208 determines whether or not the flying ball Bf at the specific time (td1) has reached the ground. For example, the repetition control part 208 determines whether or not a z coordinate value of the correction position Ctr1 at the specific time (td1) is equal to or less than a ground reference value Gs (for example, 0) indicating the ground.

As a result of the determination, when the z-coordinate value (ztr1) of the correction position Ctr1 at the specific time (td1) exceeds the ground reference value Gs (FIG. 3: S109YES), the repetition control part 208 determines that the flying ball Bf has not reached the ground yet, returns to S104, and make the prediction control part 204 carry out a prediction of a position and a velocity of the flying ball Bf at the second time (td2) next to the specific time (td1). The prediction control part 204 predicts a three-dimensional center position Cpr2 (xpr2, ypr2, zpr2) and a three-dimensional velocity (Vxpr2, Vypr2, Vzpr2) of the flying ball Bf at the second time (td2) by substituting the correction position Ctr1 (xtr1, ytr1, ztr1) and the correction velocity (Vxtr1, Vytr1, Vztr1) of the specific time (the first time) (td1) into the equation (8) (FIG. 3: S104).

Next, as shown in FIG. 11B, the conversion control part 205 converts the predicted position Cpr2 (xpr2, ypr2, zpr2) of the flying ball Bf at the second time (td2) into a two-dimensional position Cpi2 (xpi2, ypi2) in a captured image 1103 at the second time (td2) as a temporary position (FIG. 3: S105).

The acquisition control part 206 determines a search range 1104 based on the converted temporary position Cpi2 (xpi2, ypi2), specifies a flying ball image Cf2 in the captured image 1103 at the second time (td2), and acquires a two-dimensional center position Coi2 (xo2, yoi2) of the specified flying ball image Cf2 as an observation position (FIG. 3: S106).

The correction control part 207 corrects the predicted position Cpr2 and the predicted velocity of the flying ball Bf at the second time (td2) into a three-dimensional correction center position Ctr2 (xtr2, ytr2, ztr2) and a three-dimensional correction velocity (Vtr2, Vtr2, Vtr2) of the flying ball Bf at the second time (td2) based on the predicted position Cpr2 (xpr2, ypr2, zpr2) and the predicted velocity (Vxpr2, Vypr2, Vzpr2) of the flying ball Bf at the second time (td2), and the Kalman filter (FIG. 3: S107). In this way, it is possible to accurately calculate the trajectory of the flying ball Bf by sequentially correcting the position and velocity of the flying ball Bf after the initial time (td0) by using the Kalman filter.

The correction control part 207 converts the correction position Ctr2 (xtr2, ytr2, ztr2) of the flying ball Bf at the second time (td2) into a two-dimensional correction center position Cti2 (xti2, yti2) of the flying ball image Cf2. As shown in FIG. 11B, the correction control part 207 displays a trajectory of the flying ball image Cf by connecting the correction position Cti1 of the flying ball image Cf1 at the first time (td1) and the correction position Cti2 of the flying ball image Cf2 at the second time (td2) with a connecting line 1105. In this way, the player can recognize a trajectory of the flying ball image Cf in real time by sequentially displaying the correction position of the flying ball image Cf and the connecting line as the trajectory of the flying ball image Cf based on the correction position of the flying ball Bf. In addition, the connection between the stop ball image Cs at the initial time (td0) and the flying ball image Cf1 at the first time (td1) may not be consistent. Therefore, the correction control part 207 may connect the flying ball image Cf after the first time (td1) with a connecting line.

By repeating the above, for example, as shown in FIG. 12, the trajectory of the displayed flying ball image Cf becomes connecting lines 1200 in which correction positions of the flying ball image Cf are connected over time. The correction control part 207 can make a trajectory1201 of the flying ball image Cf look like a curved line by performing a smoothing process on the connecting lines 1200.

As shown in FIG. 12, the correction control part 207 can show the trajectory of the flying ball image Cf analytically by displaying a search range 1202 used for specifying the flying ball image Cf in accordance with the trajectory 1201 of the flying ball image Cf and the flying ball image Cf. The correction control part 207 sequentially displays the trajectory of the flying ball image Cf in S108, but these displays may be omitted if only the flight parameters are calculated.

By the way, the processes from S104 to S108 are repeated, in S5109, as a result of the determination, when the flying ball Bf at a specific kth time (tdk) reached the ground, and a z coordinate value (ztrk) of a correction position Ctrk (xtrk, ytrk, ztrk) of the flying ball Bf at this time becomes equal to or less than the ground reference value Gs (FIG. 3: S109N0), the repetition control part 208 determines that the flying ball Bf has reached on the ground, and finishes the repetition. In this way, it is possible to track the flying ball until the flying ball Bf reaches on the ground.

For example, as shown in FIG. 13, when a maximum height of the flying ball Bf launched by the player with the golf club is low, it is possible to detect a flying ball image Cf in a captured image until the flying ball Bf reaches on the ground. In this case, a trajectory 1300 of the flying ball image Cf is displayed and the flight ball Bf is tracked until the flying ball Bf reaches on the ground.

When the flying ball flies far and the acquisition control part 206 cannot specify a flying ball image Cf in a captured image at the kth time (tdk) in S106 (FIG. 3: S106NO), the repetition control part 208 determines that a tracking of the flying ball Bf cannot be continued (FIG. 3: S109NO), and finishes the repetition. In this way, it is possible to track the flying ball Bf until a detection limit of the flying ball image Cf in the captured image.

For example, as shown in FIG. 14, when a maximum height of the flying ball Bf launched by the player with the golf club is high, a flying ball image Cf in a captured image becomes smaller before the flying ball Bf reaches on the ground, and the flying ball image Cf in the captured image may not be detected. Or, the flight ball Bf may be hidden by the player's body, and the flying ball image Cf may not be detected. In this case, a trajectory 1400 of the flying ball image Cf is displayed and the flying ball Bf is tracked until the detection limit of the flying ball image Cf.

As shown in FIG. 14, the repetition control part 208 predicts and creates a trajectory 1401 of the flying ball image Cf after the kth time (tdk), such as the flying ball image Cf hidden by the player's body, by using a correction position and correction velocity of the flying ball Bf at the k−1th time (tdk−1) immediately before the kth time (tdk) when the flying ball image Cf not detected, and the above parametric equations (7) and (8) of the flight ball Bf. The repetition control part 208 connects the created trajectory 1401 of the flying ball image Cf and the trajectory 1400 of the flying ball image Cf from the initial time (td0) to the k−1th time (tdk−1) immediately before the flying ball image Cf not detected, and displays a connection line between the trajectory 1401 and the trajectory 1400 as an auxiliary. In this way, it is possible to simulatively confirm the trajectory 1401 of the flying ball image Cf after the kth time (tdk) even if the flying ball Bf disappears.

Since the repetition control part 208 can estimate the correction position and the correction velocity of the flying ball Bf over time, the repetition control part 208 can calculate and display carry, maximum height, and offline (central blur) of flight parameters of the flying ball Bf that have been launched by using these information.

EXAMPLES

The present invention will be explained below according to Examples, etc., and does not limit by there.

First, a ball tracking apparatus 1 was prototyped based on FIGS. 1-14, and the ball tracking apparatus 1 was used as an Example, and flight parameters (carry, maximum height, and offline) of a golf ball B launched by a golf robot were measured by using Example.

As shown in FIG. 15A, carry C of the flight parameter means a distance from a launch point S of the golf ball B to a reaching point E of the golf ball B by flying in the air when the golf ball B launches. Maximum height Hmax of the flight parameter means a maximum height of the golf ball B that flew in the air when the golf ball B launches. As shown in FIG. 15B, Offline OF of the flight parameter means a distance of central blur from the launch point S of the golf ball B to the reaching point E of the golf ball B by flying in the air when the golf ball B launches.

As a Comparative example, a commercially available flight parameter measuring apparatus was prepared, and when the golf robot launches a golf ball B with a golf club, the ball tracking apparatus of Example and the flight parameter measuring apparatus of Comparative example measured flight parameters of the golf ball B at the same time. The commercially available flight parameter measuring apparatus was an apparatus measuring flight parameters of the golf ball B based on a fluctuation of a Doppler signal by microwaves. A commercially available flight parameter measuring device is a device that measures the flight parameters of a golf ball B based on fluctuations in a Doppler signal due to microwaves.

The golf robot was adopted to eliminate an error due to a habit of a launch, and launched the golf ball B with the golf club under various conditions (swing speed, launch direction, launch angle, etc.). A measurement accuracy of the ball tracking apparatus of the present invention was verified by graphing measurement results of the ball tracking apparatus of Example and the flight parameter measuring apparatus of Comparative example.

As a result, as shown in FIG. 16, carry of the golf ball B measured by the ball tracking apparatus of Example was substantially the same as carry of the golf ball B measured by the flight parameter measuring apparatus of Comparative example. As shown in FIG. 17, maximum height of the golf ball B measured by the ball tracking apparatus of Example was substantially the same as maximum height of the golf ball B measured by the flight parameter measuring apparatus of Comparative example. Even more surprisingly, as shown in FIG. 18, offline of the golf ball B measured by the ball tracking apparatus of Example was substantially the same as the offline of the golf ball B measured by the flight parameter measuring apparatus of Comparative example. Therefore, it was found that the ball tracking apparatus according to the present invention can accurately calculate the trajectory of the flying ball after the launch.

In the embodiment of the present invention, a ball tracking apparatus corresponding to a golf ball has been described, but the present invention is not limited to this, and the present invention can be widely applied as a apparatus or a method for accurately calculating in real time a trajectory of a ball of ball games for flying (launching) a ball, such as baseball, tennis, soccer, rugby, ice hockey, gateball, etc.

In the embodiment of the present invention, the ball tracking apparatus 1 is configured to include each part, but it may be configured that a program for materializing the parts is stored in a storage medium and the storage medium is provided. In such configuration, the program is read on the apparatus materializes the respective parts. In this case, the program read from the storage medium provides the effect of the present invention. Additionally, the steps executed by the respective parts may be stored in the hard disk.

INDUSTRIAL APPLICABILITY

As described above, the ball tracking apparatus and the ball tracking method are useful as an apparatus and a method for calculating and displaying a trajectory of a ball in any ball games that flies the ball. It is effective as the ball tracking apparatus and the ball tracking method that can accurately calculate a trajectory of a flying ball after a launch.

REFERENCE SIGNS LIST

1 Ball tracking apparatus
201 Capturing control part
202 Detection control part
203 Calculation control part
204 Prediction control part
205 Conversion control part
206 Acquisition control part
207 Correction control part
208 Repetition control part

The invention claimed is:
1. A ball tracking apparatus comprising:
a capturing control part capturing a ball with a camera;
a detection control part detecting a launch of the ball;
a calculation control part calculating a three-dimensional position and a three-dimensional velocity of a world coordinate system of a flying ball at an initial time when the launch of the ball is detected as an initial position and an initial velocity;
a prediction control part predicting a three-dimensional position and a three-dimensional velocity of the world coordinate system of the flying ball at a specific time after the initial time as a predicted position and a predicted velocity based on the calculated initial position and the calculated initial velocity of the flying ball, and an equation (8) indicating a parabolic shape of the flying ball;
a conversion control part converting the predicted position of the flying ball into a two-dimensional position of a camera coordinate system in a captured image captured at the specific time as a temporary position;
an acquisition control part specifying a flying ball image indicating the flying ball in the captured image at the specific time based on the converted temporary position in the captured image, and acquiring a two-dimensional position of camera coordinate system of the specified flying ball image as an observation position;
a correction control part correcting the predicted position and the predicted velocity of the flying ball as a corrected position and a corrected velocity based on the predicted position and the predicted velocity of the flying ball, the observation position of the flying ball image, and a Kalman filter of an equation (11) of a state model and an equation (12) of an observation model;
a repetition control part calculating a trajectory of the flying ball by repeating the prediction, the conversion, the acquisition, and the correction with using the correction position and the correction velocity of the flying ball at the specific time;
wherein:
the equation (8) is

[math. 1]

$$\begin{bmatrix} x(k+1) \\ y(k+1) \\ z(k+1) \\ Vx(k+1) \\ Vy(k+1) \\ Vz(k+1) \end{bmatrix} = \qquad (8)$$

$$\begin{bmatrix} x(k) \\ y(k) \\ z(k) \\ Vx(k) \\ Vy(k) \\ Vz(k) \end{bmatrix} + \begin{bmatrix} Vx(k) \\ Vy(k) \\ Vz(k) \\ -k_d\|V(k)\|Vx(k)+k_m\{\omega y Vz(k)-\omega z Vy(k)\} \\ -k_d\|V(k)\|Vy(k)+k_m\{\omega z Vx(k)-\omega x Vz(k)\} \\ -k_d\|V(k)\|Vz(k)+k_m\{\omega x Vy(k)-\omega y Vx(k)\}-g \end{bmatrix} T,$$

kd is (−1/2m) CdρA, km is (1/2m) CmρAr, T is a capturing time interval, m (kg) is a weight of the flying ball, Cd is a coefficient of air resistance, ρ is a density of air, A is a front projected area of the flying ball, V=(Vxr, Vyr, Vzr) is a three-dimensional velocity of the flying ball, Cm is a coefficient of Magnus force, r (m) is a radius of the flying ball, ω=(ωx, ωy, ωz) is a three-dimensional spin velocity of the flying ball, ω=(ωx, ωy, ωz)=(0, 0, 0) in the initial state, and g is a gravity acceleration;
the equation (11) is $$x(k+1)=F(k)*x(k)+w(k) \qquad (11)$$

, k is a time coefficient, F (k) corresponds to the equation (8) indicating a parabolic shape at k, x (k) corresponds to the three-dimensional position and the three-dimensional velocity at k, w (k) is a process noise at k, and x (k+1) corresponds to the predicted position and predicted velocity at k+1;
the equation (12) is $$y(k)=H(k)*x(k)+v(k) \qquad (12)$$

H (k) corresponds to the equation for converting the three-dimensional position of the world coordinate system into the two-dimensional position of the camera coordinate system, v (k) is a process noise at k, and y (k) corresponds to the observation position at k.

2. The ball tracking apparatus according to claim 1, wherein:
the acquisition control part determines a search range centered on the converted temporary position in the captured image at the specific time, detects an edge image from the determined search range, calculates a minimum circle image including the detected edge image, calculates a division value by dividing a minimum occupied area of the minimum circle image from an occupied area of the edge image, and specifies an edge image in which the division value is within a range of a flying ball reference value and is closest to a circle reference value indicating a circle as a flying ball image.

3. The ball tracking apparatus according to claim 1, wherein:
the detection control part detects the launch of the ball by detecting a disappearance of a stop ball image after detecting the stop ball image showing the ball stopped for a predetermined time.

4. The ball tracking apparatus according to claim 1, wherein:
the calculation control part sets a three-dimensional center position of a stop ball image showing the ball stopped at the initial time, or the flying ball image at a specific time after the initial time as the initial position, extracts a flight ball candidate image being a possibility of the flying ball from a captured image at each time after the initial time, specifies flying ball candidates image existing on or near a straight line over time in the flying ball candidate images extracted at each time as flying ball images, and calculates the initial velocity based on the specified flight ball images based on the specified flying ball candidates.

5. The ball tracking apparatus according to claim 1, wherein:
the conversion control part calculates a two-dimensional center position, the position where a possibility of a presence of flying ball is high, in the captured image at a specific time as a temporary position by substituting the three-dimensional center position of the flying ball at the predicted specific time into equations (9) and (10);
the equations (9) and (10) are $$xi=fx*(xr/zr)+cx \qquad (9)$$

$$yi=fy*(yr/zr)+cy \qquad (10)$$

, fx is a focal distance of the camera in a x-axis direction in the camera coordinate system, fy is a focal distance of the camera in a y-axis direction in the camera coordinate system, cx is a x coordinate value of a center position of the camera in the camera coordinate system, cy is a y coordinate value of the center position of the camera in the camera coordinate system, a position (xr, yr, zr) is the three-dimensional center position, and a position (xi, yi) is the two-dimensional center position.

6. The ball tracking apparatus according to claim 1, wherein:
the acquisition control part determines a search range centered on the converted temporary position in the captured image at the specific time, and specifies a circular image showing a circle or an ellipse from the determined search range as the flying ball image.

7. The ball tracking apparatus according to claim 1, wherein:
the repetition control part predicts and creates a trajectory of the flying ball image after a kth time by using a correction position and a correction velocity of the flying ball at the k−1 th time (tdk-1) immediately before the kth time (tdk) when the flying ball image not detected, and the equation (8) indicating the parabolic shape of the flying ball.

8. The ball tracking apparatus according to claim 1, wherein:
the repetition control part finishes the repetition when a z coordinate value of the correction position at the specific time is equal to or less than a ground reference value indicating the ground or when the acquisition control part cannot specify a flying ball image in a captured image at the specific time.

9. The ball tracking apparatus according to claim 1, wherein:
the repetition control part calculates flight parameters of the flying ball by using the three-dimensional correction position and the three-dimensional correction velocity of the flying ball when finishing the repetition.

10. A ball tracking method comprising:

a capturing control step for capturing a ball with a camera;

a detection control step for detecting a launch of the ball;

a calculation control step for calculating a three-dimensional position and a three-dimensional velocity of a world coordinate system of a flying ball at an initial time when the launch of the ball is detected as an initial position and an initial velocity;

a prediction control step for predicting a three-dimensional position and a three-dimensional velocity of the world coordinate system of the flying ball at a specific time after the initial time as a predicted position and a predicted velocity based on the calculated initial position and the calculated initial velocity of the flying ball, and an equation (8) indicating a parabolic shape of the flying ball;

a conversion control step for converting the predicted position of the flying ball into a two-dimensional position of a camera coordinate system in a captured image captured at the specific time as a temporary position;

an acquisition control step for specifying a flying ball image indicating the flying ball in the captured image at the specific time based on the converted temporary position in the captured image, and acquiring a two-dimensional position of camera coordinate system of the specified flying ball image as an observation position;

a correction control step for correcting the predicted position and the predicted velocity of the flying ball as a corrected position and a corrected velocity based on the predicted position and the predicted velocity of the flying ball, the observation position of the flying ball image, and a Kalman filter of an equation (11) of a state model and an equation (12) of an observation model;

a repetition control step for calculating a trajectory of the flying ball by repeating the prediction, the conversion, the acquisition, and the correction with using the correction position and the correction velocity of the flying ball at the specific time;

wherein:

the equation (8) is

[math. 2]

$$\begin{bmatrix} x(k+1) \\ y(k+1) \\ z(k+1) \\ Vx(k+1) \\ Vy(k+1) \\ Vz(k+1) \end{bmatrix} = \begin{bmatrix} x(k) \\ y(k) \\ z(k) \\ Vx(k) \\ Vy(k) \\ Vz(k) \end{bmatrix} + \begin{bmatrix} Vx(k) \\ Vy(k) \\ Vz(k) \\ -k_d\|V(k)\|Vx(k) + k_m\{\omega y Vz(k) - \omega z Vy(k)\} \\ -k_d\|V(k)\|Vy(k) + k_m\{\omega z Vx(k) - \omega x Vz(k)\} \\ -k_d\|V(k)\|Vz(k) + k_m\{\omega x Vy(k) - \omega y Vx(k)\} - g \end{bmatrix} T, \quad (8)$$

kd is $(-\tfrac{1}{2}m)$ CdρA, km is $(\tfrac{1}{2}m)$ CmρAr, T is a capturing time interval, m (kg) is a weight of the flying ball, Cd is a coefficient of air resistance, p is a density of air, A is a front projected area of the flying ball, V=(Vxr, Vyr, Vzr) is a three-dimensional velocity of the flying ball, Cm is a coefficient of Magnus force, r (m) is a radius of the flying ball, ω=(ωx, ωy, ωz) is a three-dimensional spin velocity of the flying ball, ω=(ωx, ωy, ωz)=(0, 0, 0) in the initial state, and g is a gravity acceleration;

the equation (11) is $$x(k+1)=F(k)*x(k)+w(k) \quad (11)$$

, k is a time coefficient, F (k) corresponds to the equation (8) indicating a parabolic shape at k, x (k) corresponds to the three-dimensional position and the three-dimensional velocity at k, w (k) is a process noise at k, and x (k+1) corresponds to the predicted position and predicted velocity at k+1;

the equation (12) is $$y(k)=H(k)*x(k)+v(k) \quad (12)$$

, H (k) corresponds to the equation for converting the three-dimensional position of the world coordinate system into the two-dimensional position of the camera coordinate system, v (k) is a process noise at k, and y (k) corresponds to the observation position at k.

* * * * *